(12) United States Patent
Zushi et al.

(10) Patent No.: US 11,870,355 B2
(45) Date of Patent: Jan. 9, 2024

(54) POWER CONVERTING DEVICE, AND CONTROL METHOD FOR POWER CONVERTING DEVICE

(71) Applicants: NISSAN MOTOR CO., LTD., Yokohama (JP); RENAULT S.A.S., Boulogne-Billancourt (FR)

(72) Inventors: Yusuke Zushi, Kanagawa (JP); Yosuke Tomita, Kanagawa (JP); Yuji Saito, Kanagawa (JP); Keisuke Takemoto, Kanagawa (JP); Shigeharu Yamagami, Kanagawa (JP)

(73) Assignees: NISSAN MOTOR CO., LTD., Yokohama (JP); RENAULT S.A.S., Boulogne-Billancourt (FR)

(*) Notice: Subject to any disclaimer, the term of this patent is extended or adjusted under 35 U.S.C. 154(b) by 375 days.

(21) Appl. No.: 17/275,314

(22) PCT Filed: Sep. 13, 2018

(86) PCT No.: PCT/IB2018/001148
§ 371 (c)(1),
(2) Date: Mar. 11, 2021

(87) PCT Pub. No.: WO2020/053615
PCT Pub. Date: Mar. 19, 2020

(65) Prior Publication Data
US 2022/0038014 A1    Feb. 3, 2022

(51) Int. Cl.
*H02M 3/335* (2006.01)
*H02M 1/00* (2006.01)
*H02M 3/00* (2006.01)

(52) U.S. Cl.
CPC ..... *H02M 3/33573* (2021.05); *H02M 1/0058* (2021.05); *H02M 3/01* (2021.05)

(58) Field of Classification Search
CPC ... H02M 3/33573; H02M 1/0058; H02M 3/01
See application file for complete search history.

(56) References Cited

U.S. PATENT DOCUMENTS

| 2001/0021114 A1* | 9/2001 | Terashi | H02M 3/33592 363/16 |
| 2002/0075700 A1* | 6/2002 | Birumachi | H02M 3/33569 363/25 |

(Continued)

FOREIGN PATENT DOCUMENTS

| JP | 2001-157447 A | 6/2001 |
| JP | 2004-312949 A | 11/2004 |

(Continued)

*Primary Examiner* — Kyle J Moody
(74) *Attorney, Agent, or Firm* — Foley & Lardner LLP

(57) ABSTRACT

The present disclosure includes a conversion circuit (10) having a switching element and converting DC voltage into AC voltage by switching operation of the switching element, an isolation transformer (3) for which an input side is connected to the conversion circuit (10), a rectifier circuit (4) connected to an outside of the isolation transformer (3), a resonance circuit connected to the output side of the isolation transformer (3), and a control circuit (100) for controlling the switching element, wherein the control circuit (100) turning on the switching element in a period when current flowing through resonance circuit flows from a low potential side terminal to a high potential side terminal of the switching element via the isolation transformer (3).

15 Claims, 11 Drawing Sheets

(56) References Cited

U.S. PATENT DOCUMENTS

| | | | |
|---|---|---|---|
| 2004/0208021 A1 | 10/2004 | Takada | |
| 2011/0013425 A1* | 1/2011 | Frattini | H02M 3/33569 363/21.12 |
| 2013/0077356 A1* | 3/2013 | Cohen | H02M 3/33507 363/21.02 |
| 2013/0301306 A1* | 11/2013 | Hosotani | H02M 3/338 363/21.02 |
| 2013/0301308 A1* | 11/2013 | Hosotani | H02M 3/3381 363/21.03 |
| 2019/0214916 A1 | 7/2019 | Takahara et al. | |

FOREIGN PATENT DOCUMENTS

| | | |
|---|---|---|
| JP | 2011-024346 A | 2/2011 |
| JP | 2014-103708 A | 6/2014 |
| JP | 2017-147917 A | 8/2017 |
| WO | WO-2018/061286 A1 | 4/2018 |

* cited by examiner

POWER CONVERTING DEVICE, AND CONTROL METHOD FOR POWER CONVERTING DEVICE

TECHNICAL FIELD

The present invention relates to a power conversion apparatus and method of controlling a power conversion apparatus.

BACKGROUND ART

A switching power supply is known in which a full-bridge type inverter is provided, in which an input side and an output side are connected via an isolation transformer, and in which the input side, which is a primary side of the isolation transformer, is equipped with switching elements $Q_1$, $Q_2$, $Q_3$, $Q_4$. And the switching power supply uses an output capacitor a leakage inductance of the isolation transformer and an output capacitor provided on the output side, which is a secondary side of the isolation transformer, as a smoothing means (Patent Document 1). In this switching power supply, the circuit configuration of the secondary is a center-chip rectifier circuit. The secondary side of the isolation transformer consists of transformers $Tr_2$ and $Tr_1$. As a secondary rectifier, the switching element $Q_5$ is connected in series to the transformer $Tr_2$. The switching element $Q_6$ is connected in series to the transformer $Tr_2$. A single diode D is connected in series to each of the switching element $Q_5$ and the switching element $Q_6$.

PRIOR ART DOCUMENT

Patent Document

[Patent Document 1] JP 2017-147917 A

SUMMARY OF INVENTION

Problems to be Solved by Invention

In the prior art, switching elements are provided on the secondary side of the isolation transformer for soft switching. Increasing switching elements complicates the circuit configuration and complicates the control.

A problem to be solved by the present invention is to provide a power conversion apparatus and a method of controlling a power conversion apparatus which can realize soft switching by a relatively simple control.

Means for Solving Problems

The present invention solves the above problem by providing a resonance circuit connected to an output side of an isolation transformer and turning on a switching element in a period when current flowing through the resonance circuit flows from a low potential side terminal of the switching element to a high potential side terminal of the switching element via the isolation transformer.

Effect of Invention

According to the present invention, soft switching can be realized by a relatively simple control.

MODE(S) FOR CARRYING OUT THE INVENTION

Hereinafter, an embodiment of the present invention will be explained with reference to the drawings.

Figure 1:
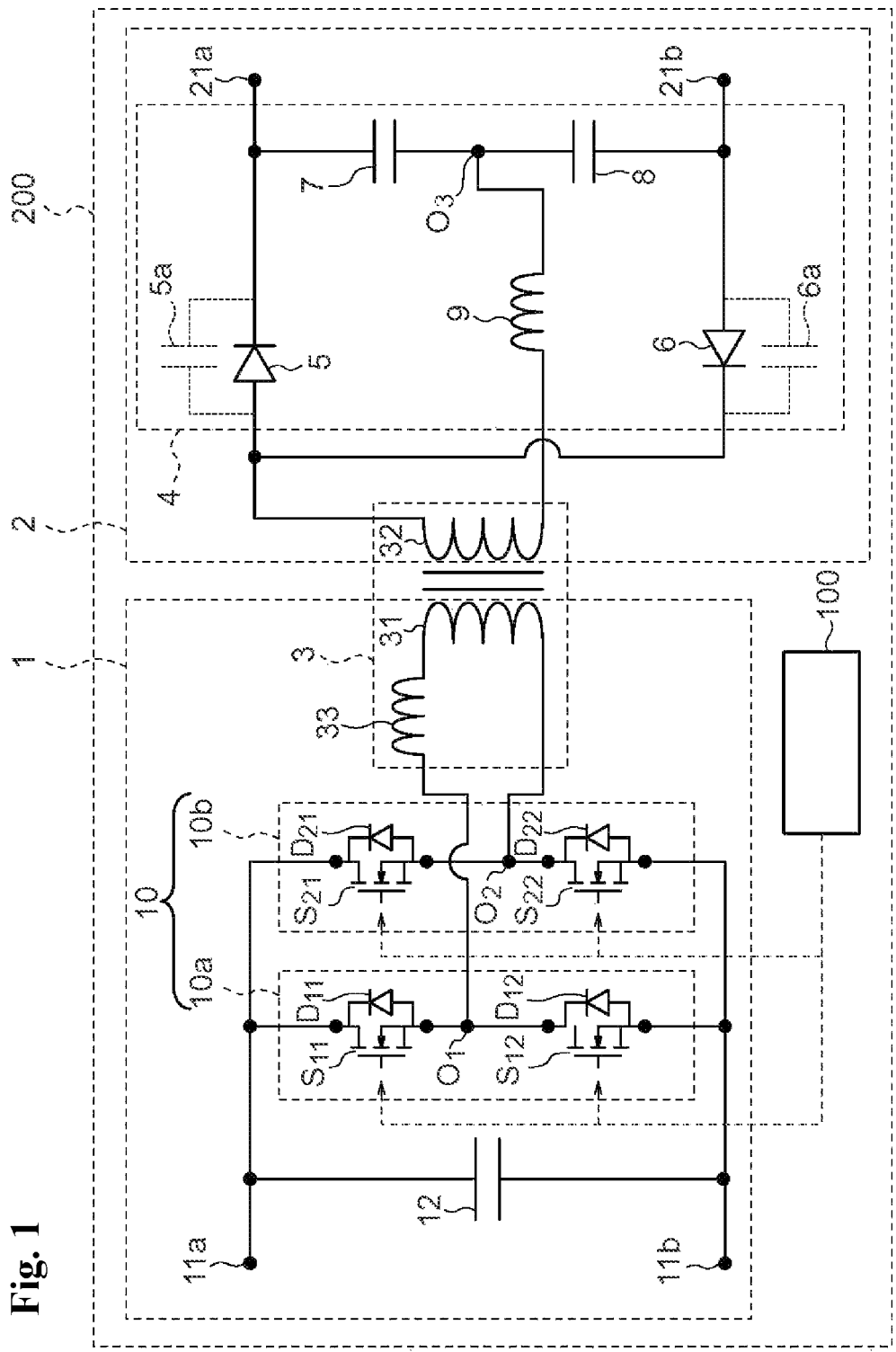
FIG. 1 is a schematic diagram of a power conversion system including a power conversion apparatus according to the present embodiment.

A power conversion apparatus according to the present embodiment will be described with reference to FIG. 1. FIG. 1 is a schematic diagram of a power conversion system including a power conversion apparatus 200 according to the present embodiment. The power conversion apparatus 200 according to the present embodiment converts power input from the power source and supplies the converted power to the loads. The power conversion apparatus is used, for example, in a vehicle-mounted charging system. As a concrete example, a charging system using a power source as a solar cell and a load as a secondary battery is exemplified. Incidentally, in the following description, the power source is used as the solar cell and the load is used as the secondary battery, and the embodiment will be described, but the power source is not limited to the solar cell, but may be another power source. In addition, the load is not limited to the secondary battery, but may be a device or an apparatus such as an air conditioner. Further, the power conversion apparatus does not necessarily have to be mounted in the vehicle and may be mounted in other devices or other apparatus other than the vehicle.

As shown in FIG. 1, the power conversion apparatus 200 according to the present embodiment includes a primary side circuit 1 and a secondary side circuit 2. The primary side circuit 1 is a circuit on a primary side of a DCDC converter, and the secondary side circuit 2 is a circuit on a secondary side circuit of the DCDC converter. The primary side circuit 1 have input terminals 11a and 11b, the DC power source (not shown) is connected to the input terminals 11a and 11b. The secondary side circuit 2 have output terminals 21a, 21b, a load (not shown) is connected to the output terminals 21a, 21b. For example, the solar cell is an example of the DC power source, and the secondary battery is an example of the load.

The primary side circuit 1 converts DC power input from the power source into AC power. An isolation transformer 3 is provided between the primary side circuit 1 and the secondary side circuit 2, and the primary side circuit 1 and the secondary side circuit 2 are insulated from each other.

Further, the isolation transformer 3 also provides a boosting function. The secondary side circuit 2 rectifies the boosted an alternating current (AC) to a direct current (DC), and outputs DC power from the output terminals 21a, 21b. Thus, the power conversion apparatus 200 can operate as a so-called a DC-DC converter that transforms the input DC power and outputs the transformed power as DC power.

A circuit configuration of the primary side circuit 1 will be described. The primary side circuit 1 includes a conversion circuit 10, a smoothing capacitor 12, and a primary winding 31.

The conversion circuit 10 includes a first half-bridge circuit 10a and a second half-bridge circuit 10b. The first half-bridge circuit 10a and the second half-bridge circuit 10b are connected between the power source lines connected to the input terminals 11a, 11b. The first half-bridge circuit 10a is connected in parallel with the second half-bridge circuit 10b. The conversion circuit 10 has a circuit configuration in which switching elements $S_{11}$, $S_{12}$ included in the first half-bridge circuit 10a and switching elements $S_{21}$, $S_{22}$ included in the second half-bridge circuit 10b are connected in a full-bridge form, and is a so-called full-bridge circuit. The conversion circuit 10 converts DC power input from the input terminals 11a, 11b into AC power.

The first half-bridge circuit 10a includes switching elements $S_{11}$, $S_{12}$ and diodes $D_{11}$, $D_{12}$. Examples of switching elements $S_{11}$, $S_{12}$ include element(s) that connects or disconnects between a high potential side terminal and a low potential side terminal by controlling voltage of a control terminal. The element(s) functioning as a switch by controlling the voltage, for example, IGBT, MOSFET. Incidentally, the switching elements $S_{11}$, $S_{12}$ may be elements that functions as a switch by controlling current flowing in the control terminal. The element(s) functioning as a switch by controlling the current, for example, a bipolar transistor. In the following explanation, Nch MOSFET is used as the switching elements $S_{11}$, $S_{12}$ and switching elements $S_{21}$, $S_{22}$ to be described later. In this case, a gate terminal of Nch MOSFET corresponds to the control terminal of each switching element, a drain terminal of Nch MOSFET corresponds to the high potential terminal of each switching element, and a source terminal of Nch MOSFET corresponds to the low potential terminal of each switching element.

As shown in FIG. 1, a drain terminal of the switching element $S_{11}$ is connected to the input terminal 11a via the power source line, and a source terminal of the switching element $S_{11}$ is connected to a drain terminal of the switching element $S_{12}$. The source terminal of the switching element $S_{12}$ is connected to the input terminal 11b via the power source line. A control signal is input to a gate terminal of the switching element $S_{11}$ and the switching element $S_{12}$ from the control circuit 100, as described below, respectively. In response to respective control signals, the switching element $S_{11}$ and the switching element $S_{12}$ conduct or cut off between the drain terminal and the source terminal, and function as switches. In addition, a connection point $O_1$ between the source terminal of the switching element $S_{11}$ and the drain terminal of the switching element $S_{12}$ is electrically connected to one end of the primary winding 31, which will be described later. The first half-bridge circuit 10a converts DC voltage input from the input terminals 11a and 11b into AC voltage by switching operations of the switching element $S_{11}$ and the switching element $S_{12}$, and outputs AC voltage from the connection point $O_1$ to the isolation transformer 3.

The diode $D_{11}$ is connected in parallel to the switching element $S_{11}$ so that current flows in the opposite direction to the direction of current flows through the switching element $S_{11}$. The diode $D_{12}$ is also connected in parallel to the switching element $S_{12}$ so that current flows in the opposite direction to the direction of current flows through the switching element $S_{12}$. Thus, the diode $D_{11}$ and diode $D_{12}$ function as a reflux diode, respectively. For example, even when the switching element $S_{11}$ is off, if current flows in the direction of the source terminal to the drain terminal, current flows in the direction of the source terminal to the drain terminal via the diode $D_{11}$. The diodes $D_{11}$, $D_{12}$ may be a rectifier or MOSFET parasitic diode.

The second half-bridge circuit 10b includes switching elements $S_{21}$, $S_{22}$ and diodes $D_{21}$, $D_{22}$. Since the second half-bridge circuit 10b has the same circuit configuration as the first half-bridge circuit 10a, the description of the second half-bridge circuit 10b is incorporated in the description of the first half-bridge circuit 10a as appropriate. For example replacing the switching element $S_{11}$ in the first half-bridge circuit 10a with the switching element $S_{21}$ and replacing the switching element $S_{12}$ in the first half-bridge circuit 10a with the switching element $S_{22}$, result in the circuit configuration of the second half-bridge circuit 10b. Incidentally, in the second half-bridge circuit 10b, unlike the first half-bridge circuit 10a, a connection point $O_2$ between the source terminal of the switching element $S_{21}$ and the drain terminal of the switching element $S_{22}$ is electrically connected to the other end of the primary winding 31 which is described later. The second half-bridge circuit 10b converts DC voltage input from the input terminals 11a, 11b to AC voltage by switching operation of the switching element $S_{21}$ and the switching element $S_{22}$, and outputs AC voltage from the connection point $O_2$ to the isolation transformer 3.

The diode $D_{21}$ is connected in parallel to the switching element $S_{21}$ so that current flows in the opposite direction to the direction of current flows through the switching element $S_{21}$. The diode $D_{22}$ is also connected in parallel to the switching element $S_{22}$ so that current flows in the opposite direction to the direction of current flows through the switching element $S_{22}$. Thus, the diode $D_{21}$ and diode $D_{22}$ function as a reflux diode, respectively. The diodes $D_{21}$, $D_{22}$ may be a rectifier device or MOSFET parasitic diode.

The primary winding 31 is a primary side coil of the isolation transformer 3. The primary winding 31 is input with AC power from the conversion circuit 10. The primary winding 31 is a coil for supplying the input AC power to a secondary side. One end of the primary winding 31 is electrically connected to the output terminal (connection point $O_1$) of the first half-bridge circuit 10a, and the other end of the primary winding 31 is electrically connected to the output terminal (connection point $O_2$) of the second half-bridge circuit 10b. In general, the primary winding 31 and the secondary winding 32 of the isolation transformer 3 are not magnetically perfectly coupled to each other, a part of the winding of the isolation transformer 3 acts as an inductance. Such inductance becomes leakage inductance. In the present embodiment, as shown in FIG. 1, as a part of the isolation transformer 3 shows a leakage inductance 33. The leakage inductance 33 is represented as being connected in series between the output terminal of the primary winding 31 and the first half-bridge circuit 10a.

The smoothing capacitor 12 smooths voltage input from the input terminals 11a, 11b. The smoothing capacitor 12 is provided between a pair of power source lines connected to the input terminals 11a, 11b, and is connected in parallel with the conversion circuit 10.

Next, the circuit configuration of the secondary side circuit 2 will be described. The secondary side circuit 2 includes a secondary winding 32 and a rectifier circuit 4.

The secondary winding 32 is a secondary coil the isolation transformer 3. The secondary winding 32 is magnetically coupled to the primary winding 31. When current flows through the primary winding 31, magnetic flux is generated in the primary winding 31, and then an induced electromotive force is generated in the secondary winding 32 by this magnetic flux. As a result, the secondary winding 32 is input with AC power from the primary winding 31. The winding ratio of the secondary winding 32 is greater than the winding ratio of the primary winding 31. In this case, in the secondary winding 32, voltage of the primary winding 31 is boosted according to the winding ratio and the boosted voltage is generated. One end of the secondary winding 32 is connected to an anode terminal of a diode 5 and a cathode terminal of a diode 6. The other end of the secondary winding 32 is connected to one end of a filter inductor 9.

The rectifier circuit 4 includes the diodes 5, 6, output capacitors 7, 8, and the filter inductor 9. In the present embodiment, the rectifier circuit 4 is a circuit called so-called double voltage rectifier circuit. The anode terminal of the diode 5 is connected to the cathode terminal of the diode 6 and one end of the secondary winding 32. A cathode terminal of the diode 5 is connected to one end of the output capacitor 7 and the output terminal 21a. Further, an anode terminal of the diode 6 is connected to the other end of the output capacitor 8 and the output terminal 21b. The other end of the output capacitor 7 and one end of the output capacitor 8 are connected to each other at a connection point $O_3$. The connection point $O_3$ is connected to the other end of the secondary winding 32 via the filter inductor 9.

By making the circuit configuration of the rectifier circuit 4 as shown in FIG. 1, current flowing through the rectifier circuit 4 is divided into current flowing from one end of the secondary winding 32 in the direction of the other end of the secondary winding 32 in order of the diode 5, the output capacitor 7, and the filter inductor 9 (also referred to as positive current) and current flowing from the other end of the secondary winding 32 in the direction of one end of the secondary winding 32 in the order of the filter inductor 9, the output capacitor 8, and the diode 6 (also referred to as negative current). Thereby, the positive current is rectified by the diode 5 and charging is performed in the output capacitor 7 by the rectified current. Further, the negative current is rectified by the diode 6 and charging is performed in the output capacitor 8 by the rectified current. The positive current and the negative current are related in opposite directions flowing through the secondary winding 32. Therefore, while charging is performed in the output capacitor 7, discharging is performed in the output capacitor 8. Conversely, while charging is performed in the output capacitor 8, discharging is performed in the output capacitor 7. As a result, DC voltage is produced for each of the positive current and the negative current. Between the output terminal 21a and the output terminal 21b, DC voltage of twice the square root of two is generated with respect to the effective value of AC voltage output from the secondary winding 32.

In addition, the rectifier circuit 4 has a junction capacitance 5a of the diode 5, and a junction capacitance 6a of the diode 6. The capacitance value of each junction capacitance 5a, 6a should be sufficiently smaller than capacitance value of each output capacitor 7, 8.

The filter inductor 9 is a coil for removing a noise component included in current. In the present embodiment, the filter inductor 9 is connected in series between the other end of the secondary winding 32 and the connection point $O_3$. Since the positive current and the negative current flowing through rectifier circuit 4 pass through the filter inductor 9, respectively, the noise included in the positive and negative current is removed by the filter inductor 9.

Since the filter inductor 9 is connected to the connection point $O_3$, the power conversion apparatus 200 according to the present embodiment includes two resonance circuits. Specifically, there are two resonant circuits: a resonant circuit consisting of the filter inductor 9, the output capacitor 7, and the junction capacitance 5a of the diode 5, and a resonant circuit consisting of the filter inductor 9, the output capacitor 8, and the junction capacitance 6a of the diode 6. The operation of these two resonance circuits will be described later. In the present embodiment, the inductance value of the filter inductor 9 should be sufficiently larger than the inductance value of the leakage inductance 33.

The control circuit 100 will be described. The control circuit 100 consists of a microcomputer or a FPGA (Field-Programmable Gate Array) including a CPU (Central Processing Unit), a ROM (Read Only Memory), and a RAM (Random Access Memory).

The control circuit 100 controls switching operation of each switching elements $S_{11}$, $S_{12}$, $S_{21}$, and $S_{22}$ included in the conversion circuit 10. Specifically, the control circuit 100 generates control signals for turning on and off the switching elements $S_{11}$, $S_{12}$, $S_{21}$, and $S_{22}$, and outputs the control signals to each gate terminal of the switching elements $S_{11}$, $S_{12}$, $S_{21}$, and $S_{22}$. For example, the control circuit 100 generates a pulse signal having a switching frequency fs, based on a reference clock. The control circuit 100 amplifies the pulse signal to a level that can be driven by the switching elements $S_{11}$, $S_{12}$, $S_{21}$, and $S_{22}$ by a driving circuit (not shown) and outputs the amplified signal as the control signal to each gate terminal of the switching elements $S_{11}$, $S_{12}$, $S_{21}$, and $S_{22}$. This causes the switching elements $S_{11}$, $S_{12}$, $S_{21}$, and $S_{22}$ to turn on or turn off in response to the control signal. A turn-on is an operation in which switching elements $S_{11}$, $S_{12}$, $S_{21}$, and $S_{22}$ switch from an off state to an on state, and a turn-off is an operation in which the switching elements $S_{11}$, $S_{12}$, $S_{21}$, and $S_{22}$ switch from the on state to the off state.

In the present embodiment, the control circuit 100 controls the switching operation of each of the switching elements $S_{11}$, $S_{12}$, $S_{21}$, and $S_{22}$ so that the power conversion apparatus 200 operates as so-called phase-shift type full-bridge DC/DC converter.

The control to the specific switching element will be describe. The control circuit 100 controls each of the switching elements $S_{11}$, $S_{12}$, $S_{21}$, and $S_{22}$ so that on-period of each of the switching elements $S_{11}$, $S_{12}$, $S_{21}$, and $S_{22}$ is half of one cycle. The control circuit 100 also controls the switching element $S_{11}$ and the switching element $S_{12}$ to turn on/off alternately. That is, the control circuit 100 controls the switching element $S_{11}$ to be in off state when the switching element $S_{12}$ is in on state, and to be in off state when the switching element $S_{12}$ is in on state. Similarly, the control circuit 100 controls the switching element $S_{21}$ and the switching element $S_{22}$ to turn on/off alternately.

In addition, the control circuit 100 controls output voltage of the power conversion apparatus 200 based on phase difference between the output voltage of the first half-bridge circuit 10a and the output voltage of the second half-bridge circuit 10b. When a reference is a time at which the voltage begins to be output from the first half-bridge circuit 10a to the primary winding 31, the phase difference of the output voltage is a time of difference between this reference time and a time until the second half-bridge circuit 10b begins to output voltage to the primary winding 31. In other words, the phase difference of the output voltage is a time of difference between a time when the switching element $S_{11}$ included in the first half-bridge circuit 10a is turned on and the switching element $S_{12}$ is turned off and a time when the switching element $S_{21}$ included in the second half-bridge circuit 10b is turned on and the switching element $S_{22}$ is turned off.

Figure 2:
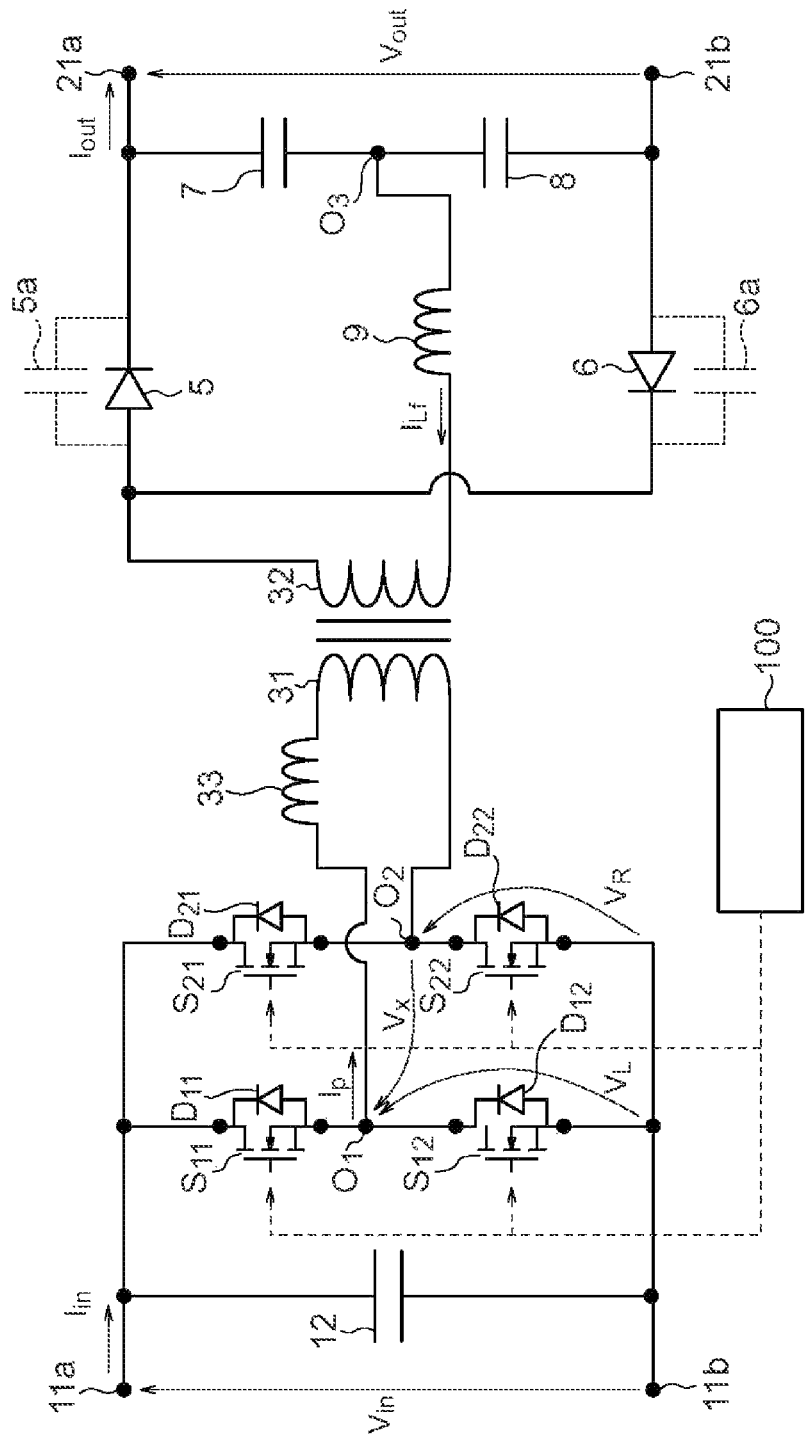
FIG. 2 is a diagram illustrating each parameter necessary to explain the operation of the power conversion apparatus.

Here, each parameter used in describing the operation of the power conversion apparatus 200 will be described using FIG. 2. FIG. 2 is a diagram illustrating each parameter necessary to explain the operation of the power conversion apparatus 200. A power conversion apparatus shown in FIG. 2 has the same configuration as the power conversion apparatus 200 shown in FIG. 1, the same reference numerals are given to the respective configurations. For this reason, the description of each configuration will be incorporated in the description using FIG. 1 as appropriate. Further, for convenience of explanation, in FIG. 2, not all the reference numerals are represented. However, FIGS. 1 and 2 show the same power conversion apparatus 200, since FIG. 2 shows the same power conversion apparatus 200, and the reference numerals not shown in FIG. 2 will be described using reference numerals shown in FIG. 1.

In the present embodiment, input voltage $V_{in}$ is DC voltage input to the power conversion apparatus 200 and is voltage between the input terminal 11a and the input terminal 11b. Output voltage $V_{out}$ is DC voltage output from the power conversion apparatus 200 and is voltage between the output terminal 21a and the output terminal 21b. Input current $I_{in}$ is a direct current input to the power conversion apparatus 200. Output current $I_{out}$ is a direct current output from the power conversion apparatus 200.

Output voltage $V_L$ is voltage output from the connection point $O_1$ of the first half-bridge circuit 10a to the primary winding 31. Specifically, output voltage $V_L$ is voltage between the drain terminal and the source terminal of the switching element $S_{12}$. For example, when the switching element $S_{11}$ turns on and the switching element $S_{12}$ turns off, the first half-bridge circuit 10a outputs voltage, which is voltage input from the input terminal 11a minus the voltage drop due to the on-resistance of the switching element $S_{11}$, to the primary winding 31. Conversely, for example, when the switching element $S_{11}$ turns off and the switching element $S_{12}$ turns on, no voltage is output from the first half-bridge circuit 10a to the primary winding 31.

Output voltage $V_R$ is voltage output from the connection point $O_2$ of the second half-bridge circuit 10b to the primary winding 31. Specifically, output voltage $V_R$ is voltage between the drain terminal and the source terminal of the switching element $S_{22}$. The operation of the second half-bridge circuit 10b when the switching element $S_{21}$ turns on and the switching element $S_{22}$ turns off and the operation of the second half-bridge circuit 10b when the switching element $S_{21}$ turns off and the switching element $S_{22}$ turns on are the same as the operation of the first half-bridge circuit 10a, respectively. So, the description of the first half-bridge circuit 10a is incorporated.

The applied voltage $V_x$ is voltage applied to the primary winding 31 and is voltage between one end of the primary winding 31 and the other end of the primary winding 31. The applied voltage $V_x$ is represented by the voltage of the difference between the output voltage $V_L$ and the output voltage $V_R$. In the present embodiment, when the output voltage $V_R$ is higher than the output voltage $V_L$, the applied voltage $V_x$ is positive voltage, and when the output voltage $V_R$ is lower than the output voltage $V_L$, the applied voltage $V_x$ is negative voltage. When the output voltage $V_R$ and the output voltage $V_L$ are the same, the applied voltage $V_x$ is set to zero voltage.

The primary side current $I_p$ is current input to the primary winding 31. The positive direction of the primary side current $I_p$ is a direction from the connection point $O_1$ to the connection point $O_2$ in the order of the leakage inductance 33 and the primary winding 31, as shown in FIG. 2. The secondary side current $I_{Lf}$ is current flowing through the filter inductor 9. The positive direction of the secondary side current $I_{Lf}$ is a direction from the connection point $O_3$ to the other end of the secondary winding 32 through the filter inductor 9, as shown in FIG. 2.

Figure 3:
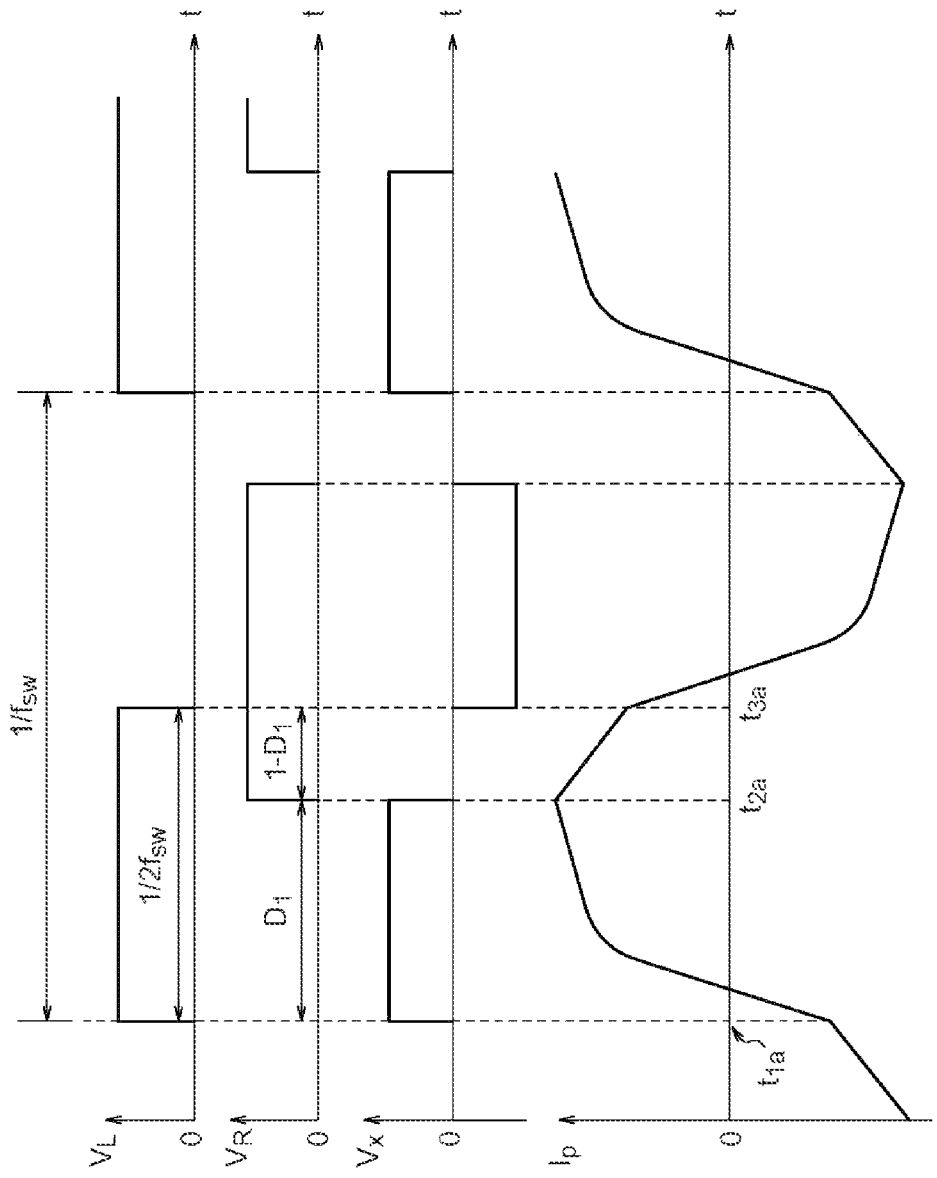
FIG. 3 is an example of the operation of the power conversion apparatus in the current-continuous mode.
Figure 4:
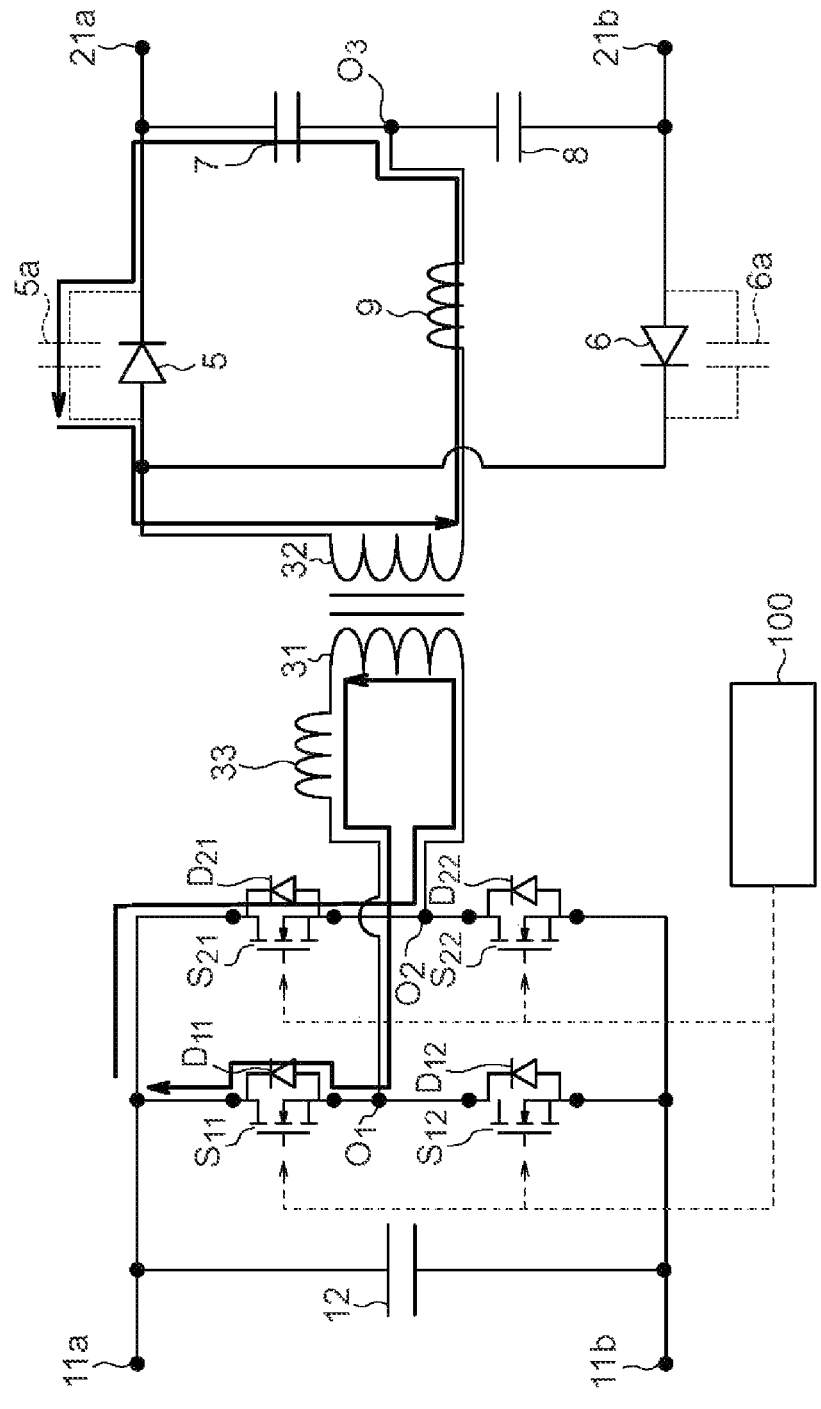
FIG. 4 is a diagram illustrating the operation of the power conversion apparatus at time $t_{1a}$ shown in FIG. 3.
Figure 5:
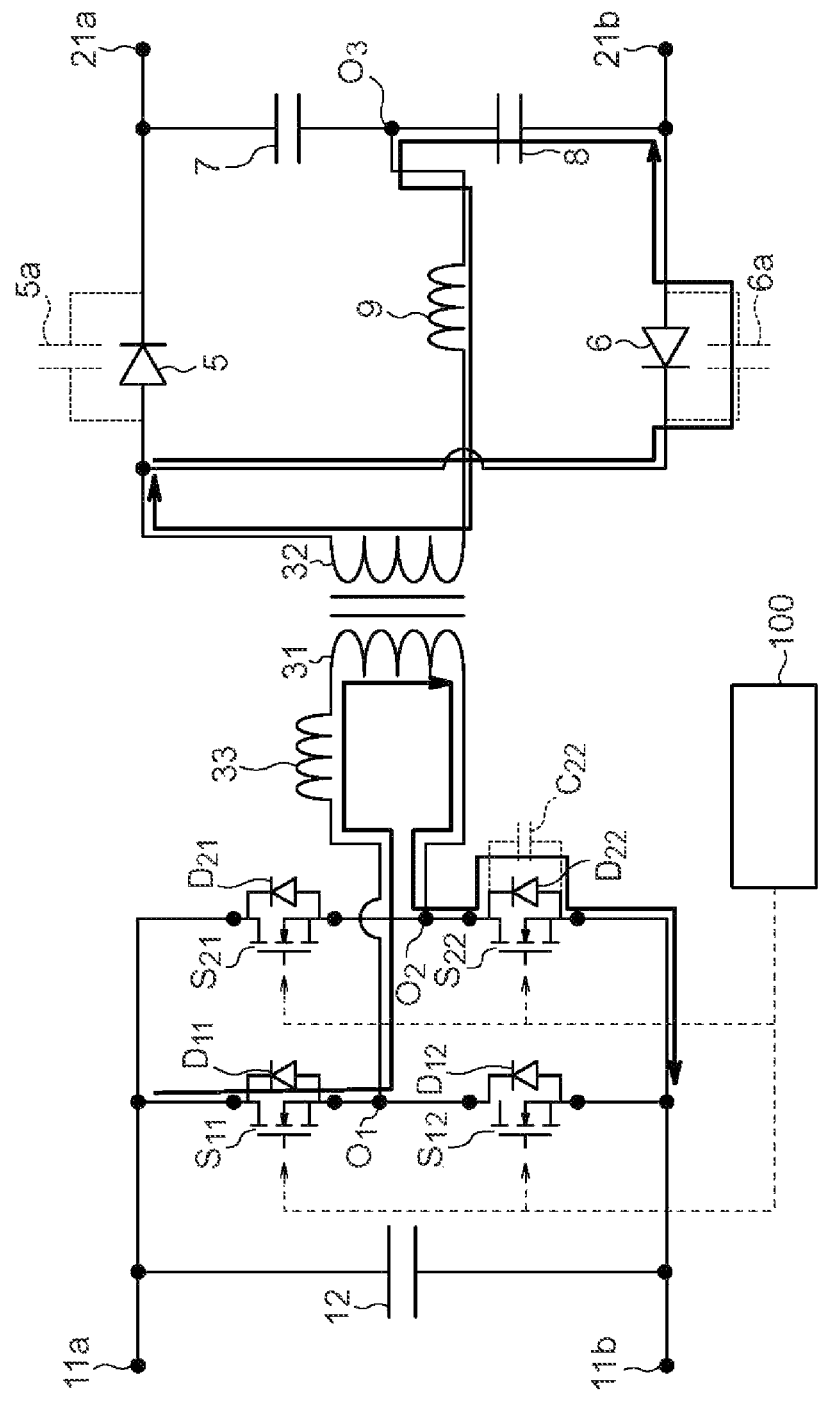
FIG. 5 is a diagram illustrating the operation of the power conversion apparatus at time $t_{2a}$ shown in FIG. 3.
Figure 6:
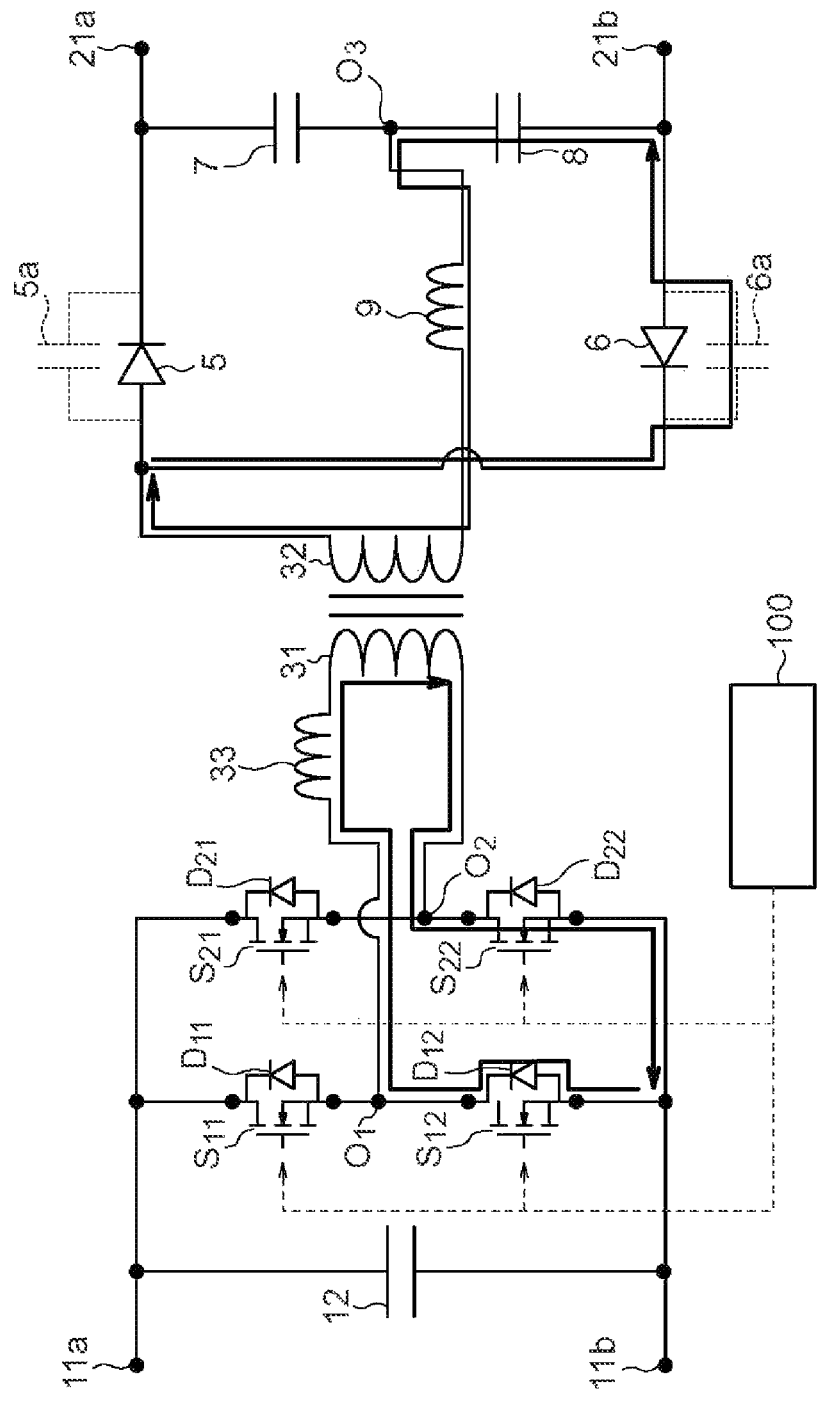
FIG. 6 is a diagram illustrating the operation of the power conversion apparatus at time $t_{3a}$ shown in FIG. 3.

Next, the operation of the power conversion apparatus 200 will be described with reference to FIGS. 3 to 6. FIG. 3 is a diagram for explaining the operation of the power conversion apparatus 200. FIG. 3 shows the characteristics of the output voltage $V_L$, $V_R$, the applied voltage $V_x$, and the primary current $I_p$ with respect to time t. FIGS. 4 to 6 show current flowing through the power conversion apparatus 200 from time $t_{1a}$ to time $t_{3a}$ shown in FIG. 3, respectively. Since the power conversion apparatus 200 shown in FIGS. 4 to 6 are the same as power conversion apparatus 200 shown in FIGS. 1 and 2, respectively, therefore the description using FIGS. 1 and 2 will be incorporated as appropriate. For convenience of explanation, in FIGS. 4 to 6, not all the reference numerals are represented. However, FIGS. 4 to 6 show the same power conversion apparatus 200 shown in FIGS. 1 and 2, and the reference numerals not shown in FIGS. 4 to 6 will be described using reference numerals shown in FIGS. 1 and 2.

As shown in FIG. 3, the output voltage $V_L$ is represented by a pulsed waveform having a half on period ($\frac{1}{2}f_{sw}$) with respect to one cycle ($1/f_{sw}$). The output voltage $V_R$ is also represented by a pulsed waveform that is half the on-period ($\frac{1}{2}f_{sw}$) for one cycle ($1/f_{sw}$). One cycle is a unit cycle that is the sum of the on-period and off-period of the switching elements $S_{11}$, $S_{12}$, $S_{21}$, and $S_{22}$. Incidentally, in the following description, a frequency in which the switching elements $S_{11}$, $S_{12}$, $S_{21}$, and $S_{22}$ operate will be referred to as a switching frequency $f_{sw}$.

From time 0 to time $t_{1a}$, the primary winding 31 has negative current flowing in the negative direction ($I_p<0$). The primary winding 31 has no voltage input from the first half-bridge circuit 10a and the second half-bridge circuit 10b ($V_L=0$, $V_R=0$). There is no potential difference between the connection point $O_1$ and the connection point $O_2$, and the applied voltage $V_x$ is zero voltage ($V_x=0$). In the range of time 0 to time $t_{1a}$, the switching elements $S_{11}$ and $S_{21}$ are in off state and the switching elements $S_{12}$ and $S_{22}$ are in on state.

At time $t_{1a}$, the primary winding 31 has negative current flowing in the negative direction ($I_p<0$). At that time, the switching element $S_{11}$ turns on and the switching element $S_{12}$ turns off. Thus, a predetermined voltage is input from the first half-bridge circuit 10a to the primary winding 31 ($V_L>0$, $V_R=0$). The voltage at the connection point $O_1$ is higher than the voltage at the connection point $O_2$, and the applied voltage $V_x$ is a predetermined positive voltage ($V_x>0$).

FIG. 4 is a diagram illustrating the operation of the power conversion apparatus 200 at the time $t_{1a}$ shown in FIG. 3. As shown in FIG. 4, at time $t_{1a}$, current flows through the secondary side circuit 2 from one end of the output capacitor 7 in the direction of the other end of the output capacitor 7, in the order of the junction capacitance 5a of the diode 5, the secondary winding 32, and the filter inductor 9 due to discharge operation of the output capacitor 7. This current is current flowing through the resonance circuit consisting of the filter inductor 9, the output capacitor 7, and the junction capacitance $5a$ of the diode 5. The current flowing through the resonance circuit of the secondary side circuit 2 then flows through the isolation transformer 3 to the primary side circuit 1. In the primary side circuit 1, the current flows in such that the direction of the current flowing through the primary winding 31 is in the opposite direction of the current flowing through the secondary winding 32. In the primary side circuit 1, current flows from one end of the primary winding 31 in the direction of the other end of the primary winding 31 in the order of the leakage inductance 33 and the diode $D_{11}$, the switching element $S_{21}$. At time $t_{1a}$, since the switching element $S_{21}$ is in off state, the current shown in FIG. 4 flows from the drain terminal to the source terminal through the output capacitance (not shown) of the switching element $S_{21}$.

Here, focusing on the switching element $S_{11}$, even though the switching element $S_{11}$ is in off state, current is flowing in the direction of the source terminal to the drain terminal through diode $D_{11}$. In the switching element $S_{11}$, the voltage between the drain terminal and the source terminal is zero. In general, a switching element has an on-resistance between the drain terminal and source terminal due to its internal construction. Therefore, for example, when the switching element turns on with a predetermined voltage applied between the drain terminal and the source terminal, power consumption based on the voltage between the drain terminal and the source terminal, and the on-resistance between the drain terminal and the source terminal is generated, which reduces power conversion efficiency (also referred to as switching loss).

In contrast, when the switching element $S_{11}$ turns on while the voltage between the drain terminal and the source terminal is zero-voltage, the power consumption generated by the switching element $S_{11}$ is significantly reduced and power conversion efficiency can be improved. In the following description, for convenience of explanation, the operation of such switching element, referred to as ZVS (Zero Voltage Switching), zero-voltage switching, or soft switching. Incidentally, the operation of the ZVS or the like, also includes an operation in which the switching element turns off while the voltage between the drain terminal and the source terminal is zero-voltage.

In the present embodiment, the control circuit 100 turns on the switching element $S_{11}$ or switching element $S_{12}$ within a period when current flowing through the resonance circuit provided in the secondary side circuit 2, i.e., a resonance circuit consisting of a portion of the rectifier circuit 4 and the filter circuit is flowing from the source terminal to the drain terminal of the switching $S_{11}$ or the switching element $S_{12}$ through the isolation transformer 3. This allows soft switching to be realized when the switching element $S_{11}$ or the switching element $S_{12}$ is turned on.

Using FIG. 3 again, the operation of the power conversion apparatus 200 will be described. From time $t_{1a}$ to time $t_{2a}$, the primary winding 31 has positive current flowing in the positive direction ($I_p>0$). The primary winding 31 has a predetermined voltage input from the first half-bridge circuit $10a$ ($V_L>0$, $V_R=0$). The applied voltage $V_x$ is a predetermined positive voltage ($V_x>0$). In the range of time $t_{1a}$ to time $t_{2a}$, the switching elements $S_{12}$, and $S_{21}$ are in off state and the switching elements $S_{11}$, and $S_{22}$ are in on state.

At time $t_{2a}$, the primary winding 31 has positive current flowing in the positive direction ($I_p>0$). At that time, the switching element $S_{21}$ turns on and the switching element $S_{22}$ turns off. As a result, a predetermined voltage is input from the second half-bridge circuit $10b$ to the primary winding 31 from a condition in which a predetermined voltage is input from the first half-bridge circuit $10a$ ($V_L>0$, $V_R>0$). When the output voltage $V_L$ and the output voltage $V_R$ are the same, there is no potential difference between the connection point $O_1$ and the connection point $O_2$, and the applied voltage $V_x$ becomes zero voltage ($V_x=0$).

FIG. 5 is a diagram illustrating the operation of the power conversion apparatus 200 at time $t_{2a}$ shown in FIG. 3. As shown in FIG. 5, at time $t_{2a}$, current flows through the secondary side circuit 2 from one end of the output capacitor 8 in the direction of the filter inductor 9, the secondary winding 32, the junction capacitance $6a$ of the diode 6, and the other end of the output capacitor 8 due to discharge operation of the output capacitor 8. This current is current flowing through the resonance circuit consisting of the filter inductor 9, the output capacitor 8, and the junction capacitance $6a$ of the diode 6. The current flowing through the resonance circuit of the secondary side circuit 2 flows then through the isolation transformer 3 to the primary side circuit 1. In the primary side circuit 1, the current flows in such that the direction of the current flowing through the primary winding 31 is in the opposite direction of the current flowing through the secondary winding 32. In the primary side circuit 1, current flows from the direction terminal $11a$ in the direction of the input terminal $11b$ in the order of the switching element $S_{11}$, the leakage inductance 33, the primary winding 31, and the switching element $S_{22}$.

Here, focusing on the switching element $S_{22}$, when the switching element $S_{22}$ is in off state, the rise of the voltage is delayed against the fall of the current due to the output capacitance of the switching element $S_{22}$ (capacitor $C_{22}$). For this reason, the switching element $S_{22}$ turns off with a low voltage difference between the drain terminal and the source terminal. As a result, a pseudo soft switching is performed on the switching element $S_{22}$. This reduces switching losses and improves power conversion efficiency even during turn-off.

Using FIG. 3 again, the operation of the power conversion apparatus 200. From time $t_{2a}$ to time $t_{3a}$, the primary winding 31 has positive current flowing in the positive direction ($I_p>0$). The primary winding 31 has a predetermined voltage input from the first half-bridge circuit $10a$ and the second half-bridge circuit $10b$ ($V_L>0$, $V_R>0$). The applied voltage $V_x$ is zero voltage ($V_x=0$). In the range of time $t_{2a}$ to time $t_{3a}$, the switching elements $S_{12}$ and $S_{22}$ are in off state and the switching elements $S_{11}$ and $S_{21}$ are in on state.

At time $t_{3a}$, the primary winding 31 has positive current flowing in the positive direction (Ip>0). At that time, the switching element $S_{12}$ turns on and the switching element $S_{11}$ turns off. As a result, no voltage is input to the primary winding 31 from the first half-bridge circuit $10a$ and a predetermined voltage is input from the second half-bridge circuit $10b$ ($V_L=0$, $V_R>0$). The voltage at the connection point $O_1$ is lower than the voltage at the connection point $O_2$, and the applied voltage $V_x$ is negative voltage ($V_x<0$).

FIG. 6 is a diagram illustrating the operation of the power conversion apparatus 200 at time $t_{3a}$ shown in FIG. 3. As shown in FIG. 6, at time $t_{3a}$, current flows through the secondary side circuit 2 from one end of the output capacitor 8 in the direction of the filter inductor 9, the secondary winding 32, the junction capacitance $6a$ of the diode 6, and the other end of the output capacitor 8 due to discharge operation of the output capacitor 8. This current is current flowing through the resonance circuit consisting of the filter inductor 9, the output capacitor 8, and the junction capacitance $6a$ of the diode 6. The current flowing through the resonance circuit of the secondary side circuit 2 flows then through the isolation transformer 3 to the primary side circuit 1. In the primary side circuit 1, the current flows in such that the direction of the current flowing through the primary winding 31 is in the opposite direction of the current flowing through the secondary winding 32. In the primary side circuit 1, current flows from the other end of the primary winding 31 in the direction of one end of the primary winding 31 in the order of the switching element $S_{22}$, the diode $D_{12}$, and the leakage inductance 33. At time $t_{3a}$, since the switching element $S_{22}$ is in off state, the current shown in FIG. 6 flows from the drain terminal to the source terminal through the output capacitance (not shown) of the switching element $S_{22}$.

Here, focusing on the switching element $S_{12}$ even though the switching element $S_{11}$ is in off state, current is flowing in the direction of the source terminal to the drain terminal through diode $D_{12}$. In the switching element $S_{12}$, the voltage between the drain terminal and the source terminal is zero. When the switching element $S_{12}$ is turned off in this state, soft switching is performed on the switching element $S_{12}$ and the power consumption generated by the switching element $S_{12}$ is significantly reduced and power conversion efficiency can be improved.

In the present embodiment, when the phase difference D (also referred to as a time ratio D) between the output voltage $V_L$ and the output voltage $V_R$ satisfies the following equation (1), the control circuit 100 can continuously supply current to the isolation transformer 3, as shown in FIG. 3. In the following, for the convenience of explanation, the operation of the power conversion apparatus 200 is referred to as the current-continuous mode.

[Equation 1]

$$D > V_{out}/(NV_{in}) \quad (1)$$

Here, "D" represents a time ratio, "N" represents a winding ratio between the primary winding 31 and the secondary winding 32, "$V_{in}$" represents input voltage of the power conversion apparatus 200, and "$V_{out}$" represents output voltage of the power conversion apparatus 200.

The control circuit 100 turns on the switching element $S_{11}$ with current flowing from the source terminal to the drain terminal of the switching element $S_{11}$ in the current-continuous mode. Likewise, the control circuit 100 turns on the switching element $S_1$ current flowing from the source terminal to the drain terminal of the switching element $S_{12}$ in the current-continuous mode. Soft switching is performed in the power conversion apparatus 200, and switching losses are restrained.

In addition, because the output capacitance of the switching element S22 delays the rate of voltage rise, the control circuit 100 turns off the switching element S22 even when the switching element S22 is in on state in the current-continuous mode. Thus, the power conversion apparatus 200 performs pseudo soft switching, it is possible to restrain switching loss.

Figure 7:
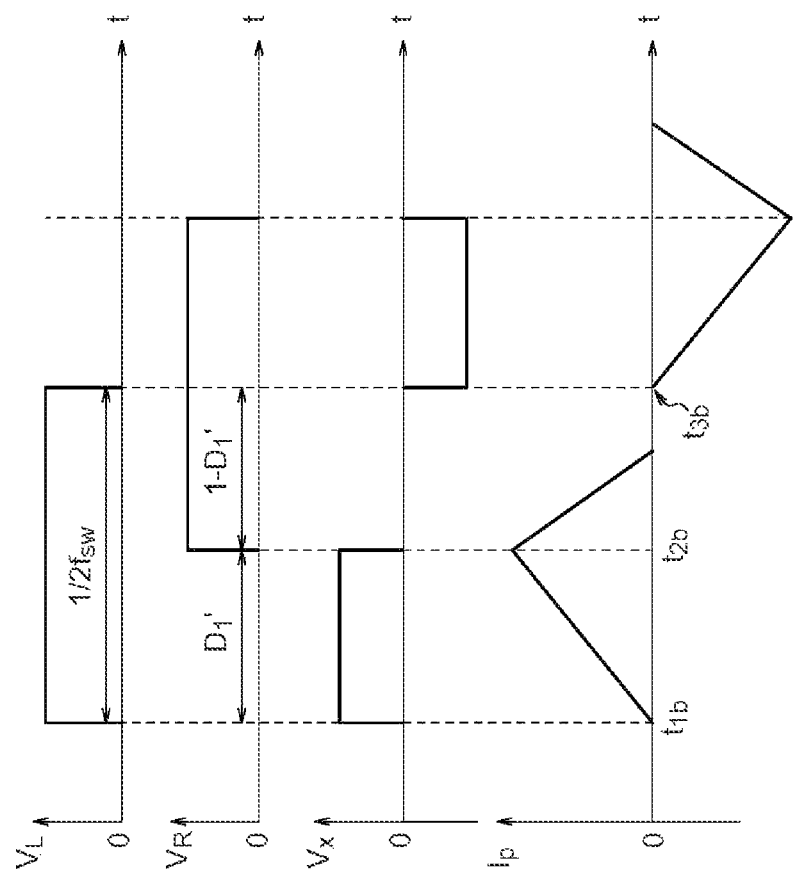
FIG. 7 is an example of the operation of the power conversion apparatus in the current-discontinuous mode.

Although the current-continuous mode of the power conversion apparatus 200 has been described so far, the operation of the power conversion apparatus 200 in the current-discontinuous mode will now be described with reference to FIG. 7. The current-discontinuous mode is a mode in contrast to the current-continuous mode, and the operation of the power conversion apparatus 200 when the time ratio D does not satisfy the above equation (1). FIG. 7 shows an example of the operation of the power conversion apparatus 200 in current-discontinuous mode. FIG. 7 shows the characteristics of the output voltage $V_L$, the output voltage $V_R$, the applied voltage $V_x$, and the primary current $I_p$ with respect to time t.

As shown in FIG. 7, when the time ratio $D_1'$ does not satisfy the above equation (1), a period in which no current flows through the primary winding 31 (a period of zero current) occurs, so that no current continuously flows through the isolation transformer 3. For example, time $t_{1b}$ is a time when a predetermined voltage is applied to the primary winding 31 from the first half-bridge circuit 10a ($V_L > 0$) and corresponds to time $t_{1a}$ shown in FIG. 3. However, when the time ratio $D_1'$ does not satisfy the above equation (1), at time $t_{1b}$, no current flows in the primary winding 31 ($I_p = 0$). In this case, since no current flows through the primary side circuit 1 as shown in FIG. 3, a predetermined voltage is generated between the drain terminal and the source terminal in the off state switching element $S_{11}$. When the switching element $S_{11}$ turns on in this condition, power is consumed based on voltages between the drain terminal and the source terminal and the on-resistance, and switching losses occur in the switching element $S_{11}$. The operation in which the switching element turns on when a predetermined voltage is generated between the drain terminal and the source terminal is referred to as hard switching as an operation that is contrasted with soft switching. In FIG. 7, even at time $t_{3b}$, no current flows through the primary winding 31 ($I_p = 0$). Therefore, in the off state switching element $S_{12}$, a predetermined voltage is generated between the drain terminal and the source terminal, and when the switching element $S_{12}$ turns on, the hard switching is performed.

In the example of FIG. 7, as time elapses from the time $t_{2b}$, current flowing through the primary winding 31 decreases. Then, at a predetermined time from time $t_{2b}$ to time $t_{3b}$, no current flows through the primary winding 31 ($I_p = 0$). Such characteristics are due to the characteristics of the isolation transformer 3. In the period indicated by time $t_{2b}$ to time $t_{3b}$, the applied voltage $V_x$ is zero voltage, no voltage is applied to the primary winding 31. In the current-discontinuous mode, in a period when voltage is not applied to the primary winding 31 (also referred to as the period of reactive power), the current flowing through the primary winding 31 becomes zero current.

Therefore, the control circuit 100 according to the present embodiment generates resonant current by the resonance circuit provided in the secondary side circuit 2 during a period when no voltage is applied to the primary winding 31 by controlling the time ratio D, so that current flows continuously through the primary side circuit 1 in the current-discontinuous mode as well as the current-continuous mode. This allows current to flow through the reflux diode to the off state switching element in the direction of the source terminal to the drain terminal in the current-discontinuous mode as well as the current-continuous mode. Then, the control circuit 100 turns on the switching element in a period when current is flowing from the source terminal to the drain terminal. As a result, even in the current-discontinuous mode, similarly to the current-continuous mode, it is possible to realize soft switching operation.

Specifically, the control circuit 100 controls the switching elements $S_{11}$, $S_{12}$, $S_{21}$, and $S_{22}$ so that the time ratio D satisfies the following equation (2).

[Equation 2]

$$\frac{V_{out}}{2NV_{in}}\left(1 - \frac{2nf_{sw}}{f_{res}}\right) \leq D \leq \frac{V_{out}}{2NV_{in}}\left\{1 - \frac{(2n-1)f_{sw}}{f_{res}}\right\} \quad (2)$$

Here, "D" represents time ratio, "N" represents winding ratio between the primary winding 31 and the secondary winding 32, "$V_{in}$" represents input voltage of the power conversion apparatus 200, "$V_{out}$" represents output voltage of the power conversion apparatus 200, "$f_{sw}$" represents switching frequency of the switching element, "$f_{res}$" represents resonance frequency of the resonance circuit included in the secondary side circuit 2, and "n" represents a natural number.

The resonance frequency $f_{res}$ is shown in the following equation (3) and (4), and the resonance frequency $f_{res}$ and the switching frequency $f_{sw}$ satisfy the relationship in the following equation (5).

[Equation 3]

$$f_{res} = \frac{\omega_{res}}{2\pi} \quad (3)$$

[Equation 4]

$$\omega_{res} = \frac{1}{\sqrt{2C_{jd}(N^2 L_s + L_f)}} \quad (4)$$

[Equation 5]

$$f_{res} \geq 2nf_{sw} \quad (5)$$

Here, "$f_{res}$" and "$\omega_{res}$" represent resonance frequency of the resonance circuit included in the secondary side circuit 2 and resonance angular frequency, respectively. Further, "$C_{jd}$" represents capacitance value of the junction capacitance 5a or 6a, "N" represents winding ratio between the primary winding 31 and the secondary winding 32, "$L_s$" represents inductance value of the leakage inductance 33, "$L_f$" represents inductance value of the filter inductor 9. "$f_{sw}$" represents switching frequency of each switching element $S_{11}$, $S_{12}$, $S_{21}$, and $S_{22}$, "$f_{res}$" represents resonance frequency of the resonance circuit provided in the secondary side circuit 2, and "n" represents a natural number.

As described above, the resonance circuit provided in the secondary side circuit 2 is the resonance circuit consisting of the filter inductor 9, the output capacitor 7, and the junction capacitance 5a of the diode 5, and the resonance circuit consisting of the filter inductor 9, the output capacitor 8, and the junction capacitance 6a of the diode 6. In the present embodiment, the capacitance value of the output capacitor 7 and the capacitance value of the output capacitor 8 are the same, the capacitance value of the junction capacitance 5a of the diode 5 and the capacitance value of the junction capacitance 6a of the diode 6 are the same. For this reason, the resonant frequency is defined by a single resonance frequency, as shown in equations (3) and (4) above.

Also, the current flowing through resonance circuit is flowing through the leakage inductance 33 of the primary side circuit 1 via the isolation transformer 3, but in the present embodiment, the inductance value of the leakage inductance 33 is sufficiently smaller than that of the filter inductor 9. Further, the capacitance value of the junction capacitance 5a of the diode 5 and the capacitance value of the junction capacitance 6a of the diode 6 are sufficiently smaller than the capacitance value of each output capacitors 7 and 8. Therefore, as shown in the above equation (4), the resonance frequency is defined by the capacitance value of the junction capacitance 5a of the diode 5 or the capacitance value of the junction capacitance 6a of the diode 6, the inductance value of the filter inductor 9.

Figure 8:
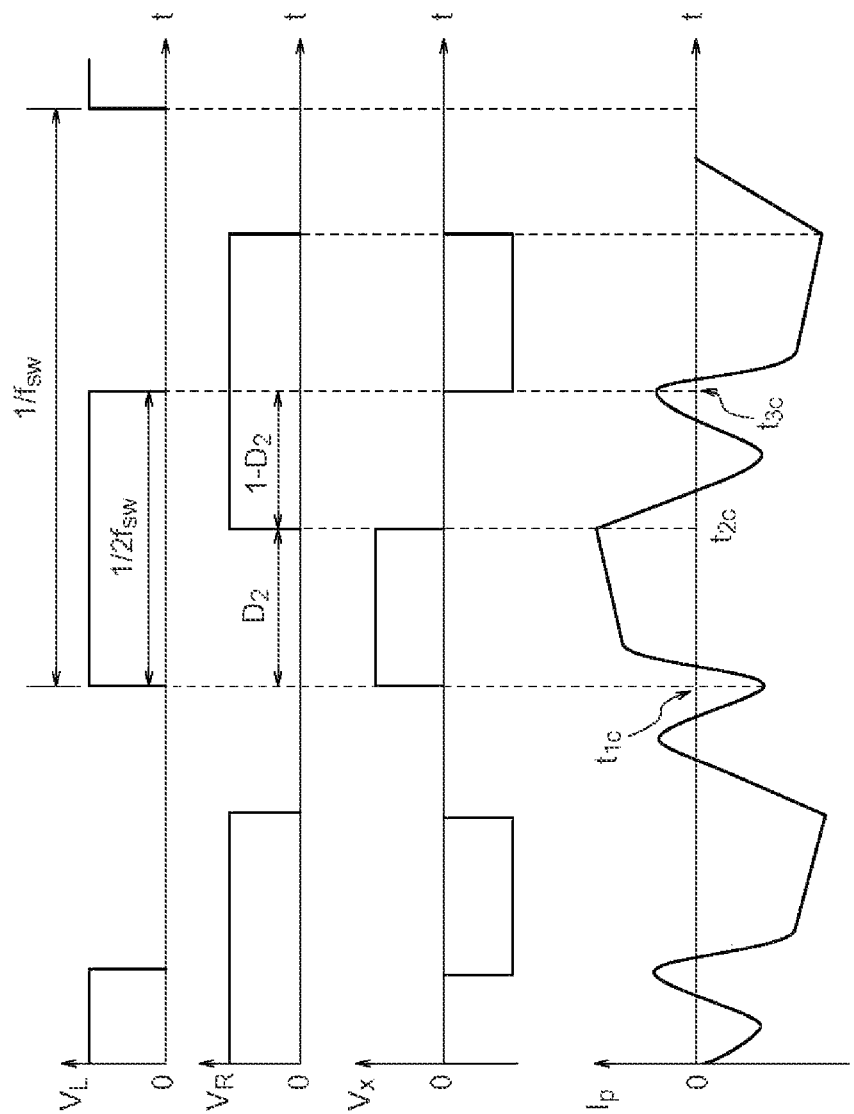
FIG. 8 is an example of the operation of the power conversion apparatus in the current-discontinuous mode.
Figure 9:
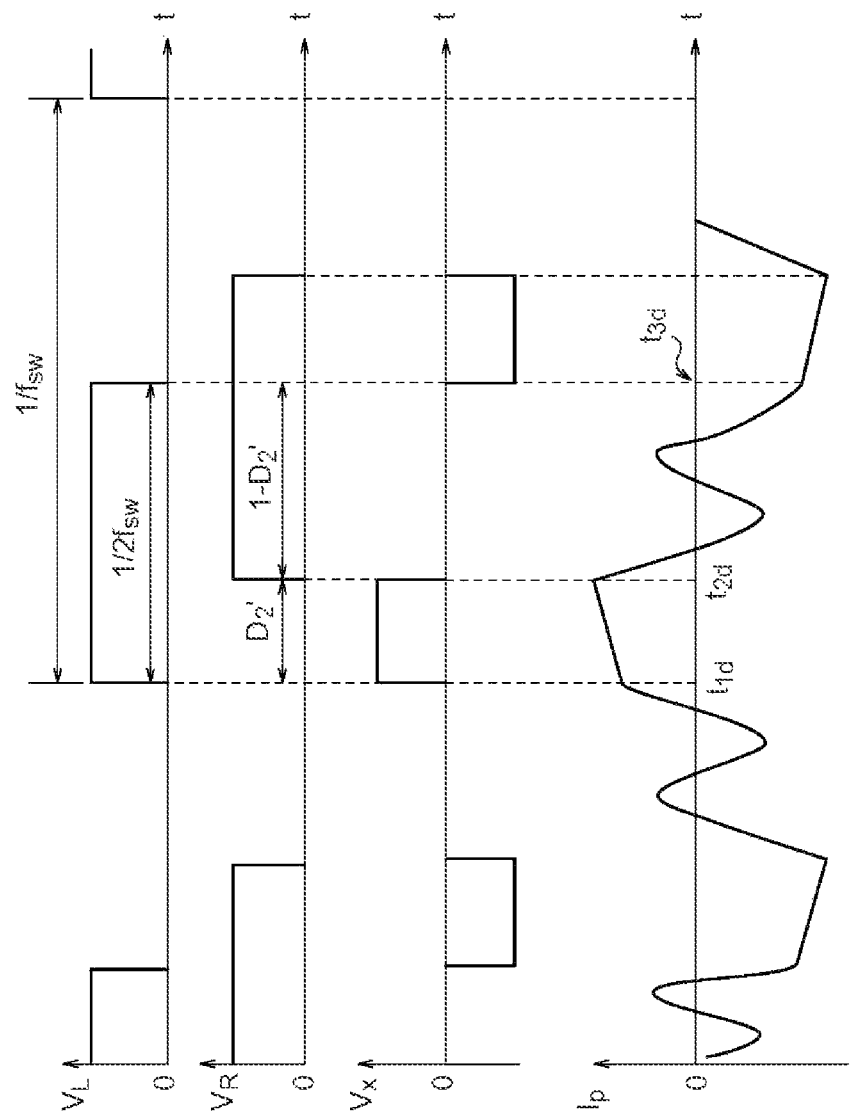
FIG. 9 is an example of the operation of the power conversion apparatus in the current-discontinuous mode.

Next, with reference to FIGS. 8 and 9, for each of the case where the time ratio D satisfies and does not satisfy the above equation (2), the operation of the power conversion apparatus 200. FIG. 8 is an example of the operation of the power conversion apparatus 200 when the time ratio $D_2$ satisfies the above equation (2). FIG. 8 shows the characteristics of the output voltage $V_L$, the output voltage $V_R$, and the applied voltage $V_x$, and the primary current $I_p$ with respect to time t.

Comparing FIGS. 8 and 7, although there is a period when no current flows through the primary winding 31 in FIG. 7, the primary winding 31 continuously predetermined current flows in FIG. 8. For example, time $t_{1c}$ is a time when a predetermined voltage is applied to the primary winding 31 from the first half-bridge circuit 10a ($V_L > 0$), and corresponds to time $t_{1a}$ shown in FIG. 3 or time $t_{1b}$ shown in FIG. 7. When the time ratio $D_2$ satisfies the above equation (2), at time $t_{1c}$, the primary winding 31 has negative current flowing in the negative direction ($I_p < 0$). In the off state switching element $S_{11}$, current flows from the source terminal to the drain via the diodes $D_{11}$, and the voltage between the drain terminal and the source terminal becomes zero voltage in the switching element $S_{11}$. When the switching element $S_{11}$ turns on in this state, soft switching is performed in the same way as the operation at time $t_{1a}$ shown in FIG. 3.

Further, time $t_{3c}$ is a time when voltage is not output from the first half-bridge circuit 10a to the primary winding 31 ($V_L = 0$) and corresponds to time $t_{3a}$ shown in FIG. 3 or time tab shown in FIG. 7. At time $t_{3c}$, the primary winding 31 has positive current flows in the positive direction ($I_p > 0$). For this reason, in the off state switching element $S_{12}$, current flows from the source terminal to the drain through $D_{12}$, and in the switching element $S_{12}$, the voltage between the drain terminal and the source terminal becomes zero voltage. When the switching element $S_{12}$ turns on in this state, soft switching is performed in the same way as the operation at time $t_{3a}$ shown in FIG. 3.

FIG. 9 is an example of the operation of the power conversion apparatus 200 when the time ratio $D_2'$ does not satisfy the above equation (2). FIG. 9 shows the characteristics of the output voltage $V_L$, the output voltage $V_R$, and the applied voltage $V_x$, and the primary current $I_p$ with respect to time t.

Comparing FIGS. 9 and 8, the primary winding 31 is common in that a predetermined current flows at all times, but the direction of the current flowing through the primary winding 31 at the timing when the switching element $S_{11}$, $S_{12}$ turns on is different. For example, time $t_{1d}$ shown in FIG. 9 is a time when a predetermined voltage is applied to the primary winding 31 from the first half-bridge circuit 10a ($V_L > 0$) and corresponds to time $t_{1c}$ shown in FIG. 8. When the time ratio $D_2'$ does not satisfy the above equation (2), at time $t_{1d}$, the primary winding 31 has positive current flowing in the positive direction ($I_p > 0$). The direction of current flowing through the primary winding 31 has a relationship in the opposite direction to the direction of current flowing through the primary winding 31 at time $t_{1c}$ shown in FIG. 9. For this reason, no current flows through the off state switching element $S_{11}$, at least in the direction of the source terminal to the drain terminal via the diode $D_{11}$. In the switching element $S_{11}$, a predetermined voltage is generated between the drain terminal and the source terminal, and when the switching element $S_{11}$ turns on, hard switching is performed.

Further, for example, time $t_{3a}$ shown in FIG. 9 is a time when voltage is not output from the first half-bridge circuit 10a to the primary winding 31 ($V_L=0$) and corresponds to time $t_{3c}$ shown in FIG. 8. At time $t_{3d}$, the primary winding 31 has negative current flowing in the negative direction ($I_p<0$). The direction of current flowing through the primary winding 31 has a relationship in the opposite direction to the direction of current flowing through the primary winding 31 at time $t_{3c}$ shown in FIG. 9. For this reason, no current flows through the off state switching element $S_{12}$, at least in the direction of the source terminal to the drain terminal via the diode $D_{12}$. In the switching element $S_{12}$, a predetermined voltage is generated between the drain terminal and the source terminal, and when the switching element $S_{12}$ turns on, hard switching is performed.

As explained in FIG. 8 and FIG. 9, when resonance current is generated by the resonance circuit provided in the secondary side circuit 2 and the resonance current is passed through the isolation transformer 3 into the primary side circuit, soft switching or hard switching is performed depending on whether the time ratio D meets the above equation (2). When the time ratio D satisfies the above equation (2), soft switching is performed because current flows in the direction of the drain terminal from the source terminal when the switching element turns on. Conversely, when the time ratio D does not satisfy the above equation (2), hard switching is performed because no current flows in the direction of the drain terminal from the source terminal when the switching element turns on. The time ratio D is a parameter that affects output power of the power conversion apparatus 200. Therefore, depending on the magnitude of the power to be output, the time ratio D does not satisfy the above equation (2), and hard switching is performed.

Figure 10:
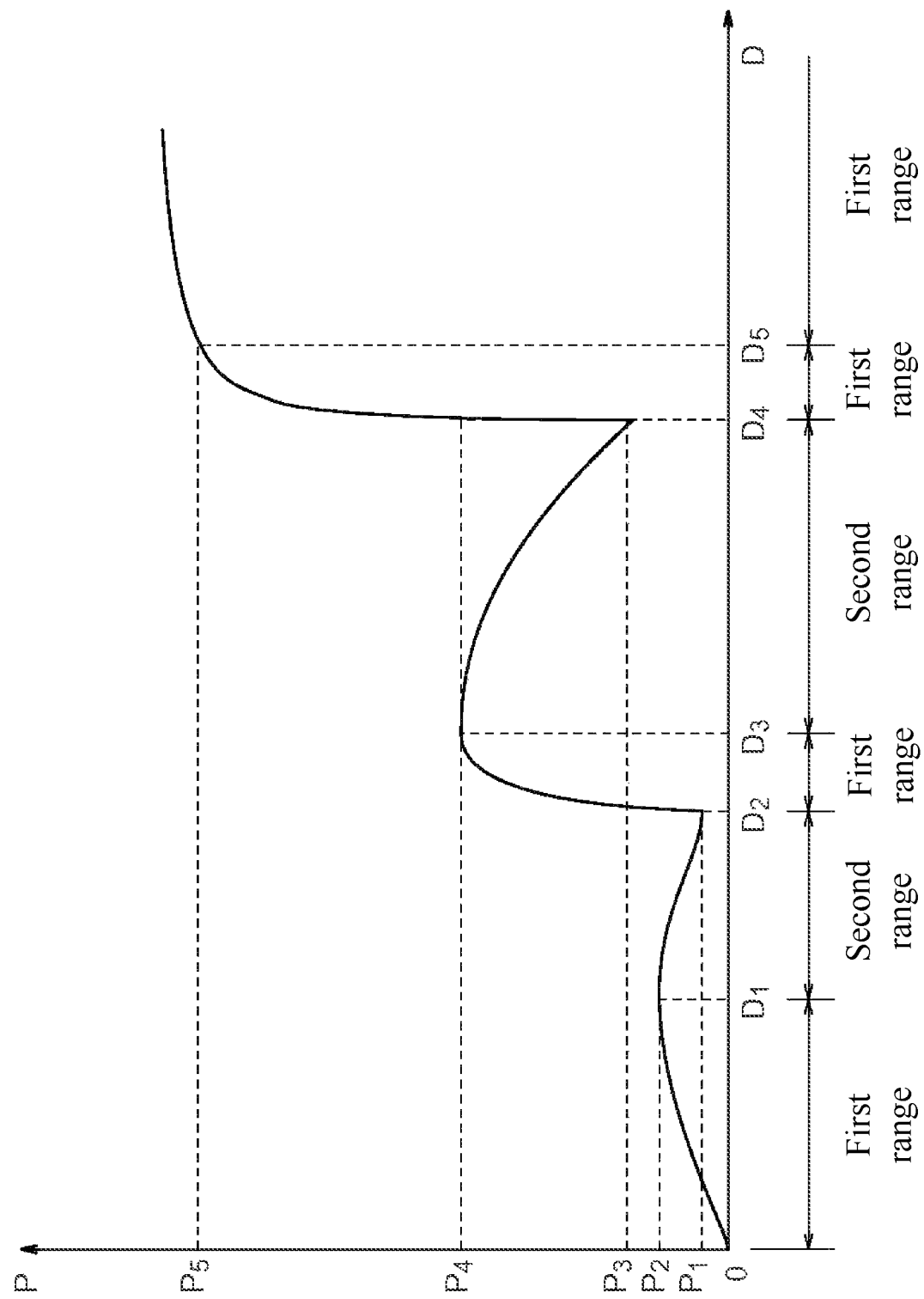
FIG. 10 is an example of the characteristics of the output power to the time ratio.

Next, using FIG. 10, the relationship between the time ratio D and output power of the power conversion apparatus 200 will be explained. FIG. 10 is an example of the characteristics of output power to the time ratio. In FIG. 10, the horizontal axis indicates the time ratio (D), the vertical axis indicates output power of the power conversion apparatus 200 (P). When the time ratio D is within the range of 0 to $D_5$, the power conversion apparatus 200 operates as current-discontinuous mode, and when the time ratio D is $D_5$ or larger, the power conversion apparatus 200 operates as current-continuous mode.

As shown in FIG. 10, the time ratio D includes two types of ranges: a range in which the output power P increases with an increase in the time ratio D (also referred to as a first range) and a range in which the output power P decreases with an increase in the time ratio D (also referred to as a second range). Further, as the time ratio D increases, the first range and the second range are alternately repeated.

For example, when the time ratio D ranges from 0 to $D_1$, $D_2$ to $D_3$, and $D_4$ to $D_5$, increase the time ratio D and the output power P increases. Therefore, these ranges fall into the first range. In these ranges, the time ratio D does not satisfy the above equation (2). That is, in the first range, hard switching is performed in the primary side circuit 1, it is impossible to restrain switching loss of the power conversion apparatus 200. On the other hand, for example, when the time ratio D ranges from $D_1$ to $D_2$, and $D_3$ to $D_4$, increase the time ratio D and the output power P decreases. Therefore, these ranges fall in to the second range. In these ranges, the time ratio D satisfies the above equation (2). That is, in the second range, soft switching is performed in the primary side circuit 1, it is possible to restrain switching loss of the power conversion apparatus 200.

The control circuit 100 according to the present embodiment, when it is necessary to output a relatively low power, considering the characteristics of the output power to the time ratio shown in FIG. 10, selects the time ratio. For example, when the output power when using the time ratio within the first range coincides with the output power when using the time ratio within the second range, the control circuit 100 selects the time ratio within the second range. In other words, the control circuit 100 preferentially selects the time ratio within the second range. Using the example of FIG. 10, for example, if it is necessary to output the output power $P_3$, time ratio that can be selected is either the time ratio within the first range ($D_2$ to $D_3$) or the time ratio within the second range ($D_3$ to $D_4$). The control circuit 100, when the output power $P_3$ when using the time ratio within the first range ($D_2$ to $D_3$) coincides with the output power $P_3$ when using the time ratio within the second range ($D_3$ to $D_4$), selects the time ratio within the second range ($D_3$ to $D_4$). This allows soft switching to be performed preferentially over hard switching in the current-discontinuous mode, thus restraining switching loss.

However, there is also a problem that the range of the time ratio used is limited so that power that can be output is limited. For example, in the example of FIG. 10, when the control circuit 100 uses the time ratio D within the second range ($D_1$ to $D_2$ and $D_3$ to $D_4$), the output power P that the power conversion apparatus 200 can output is limited to the range of $P_1$ to $P_2$ and $P_3$ to $P_4$. In other words, if it is required to output power within these ranges, it is possible to restrain switching loss by soft switching. Conversely, in the example of FIG. 10, if it is required to output power in range other than $P_1$ to $P_2$ and $P_3$ to $P_4$ (ranges of 0 to $P_1$, $P_2$ to $P_3$, and $P_4$ to $P_5$), hard switching is performed. For this reason, if it is required to output power within ranges of 0 to $P_1$, $P_2$ to $P_3$, and $P_4$ to $P_5$, switching loss cannot be restrained. The range of soft-switchable output power is limited is due to whether the time ratio D satisfies the above equation (2).

Figure 11:
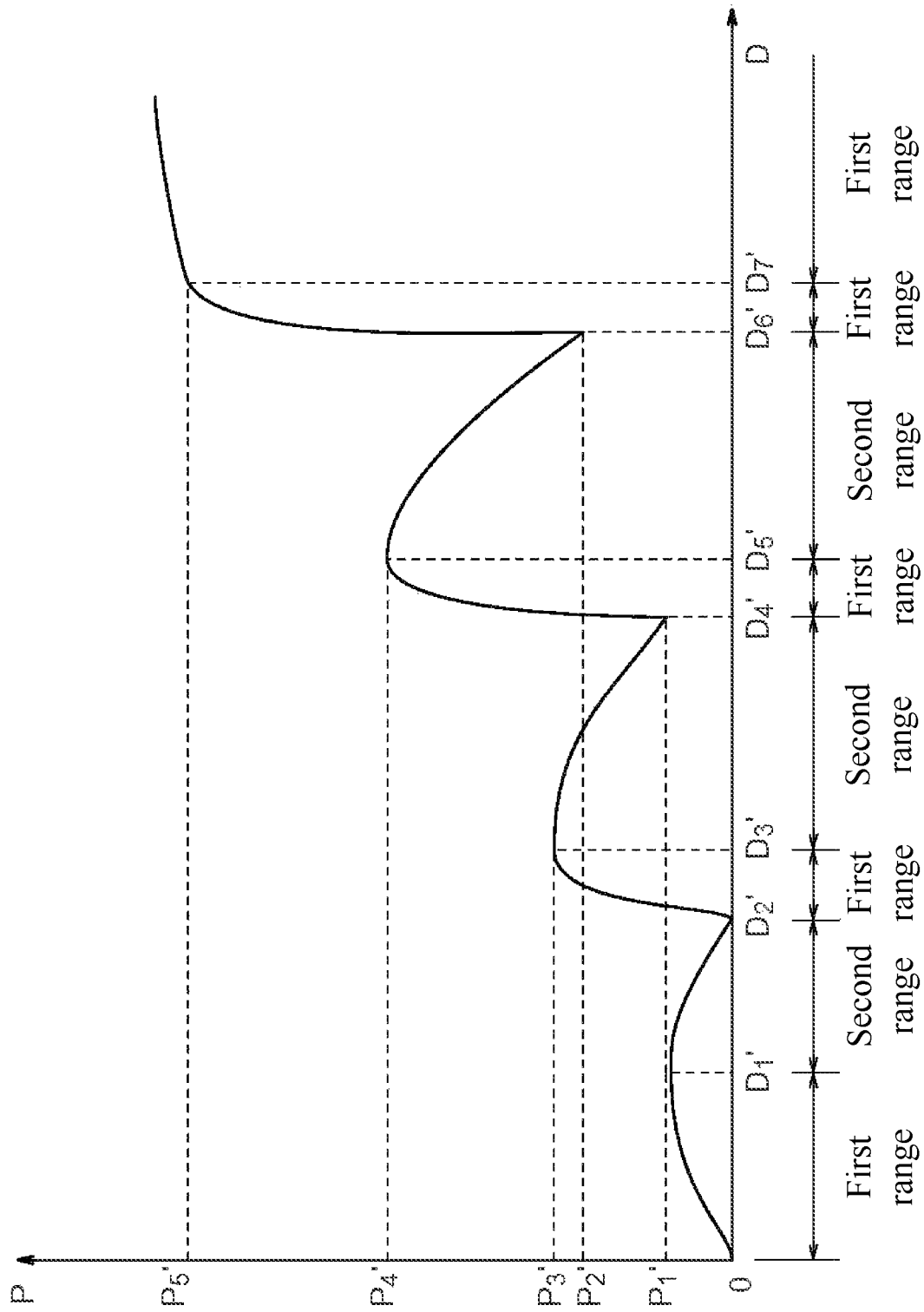
FIG. 11 is an example of the characteristics of the output power to the time ratio when resonance frequency is higher than the case of the output power characteristic shown in FIG. 10.

Here, the relationship between the time ratio D and the output power of the power conversion apparatus 200 when resonance frequency of the resonance circuit provided in the secondary side circuit 2 is increased will be described with reference to FIG. 11. FIG. 11 is an example of the characteristics of the output power to the time ratio when resonance frequency is higher than the case of the output power characteristic shown in FIG. 10. In FIG. 11, the horizontal axis indicates the time ratio (D), the vertical axis indicates the output power of the power conversion apparatus 200 (P). When the time ratio D is within 0 to $D_7'$, the power conversion apparatus 200 operates as the current-discontinuous mode, and when the time ratio D is $D_7'$ or larger, the power conversion apparatus 200 operates as the current-continuous mode.

Comparing FIGS. 11 and 10, the second range is expanded in the current-discontinuous mode due to the higher resonance frequency. Specifically, in FIG. 10, the two ranges of $D_1$ to $D_2$ and $D_3$ to $D_4$ fall into the second range, whereas in FIG. 11, the three ranges of $D_1'$ to $D_2'$, $D_3'$ to $D_4'$, and $D_5'$ to $D_6'$ fall into the second range. That is, by making the resonance frequency higher, the range of time ratio in which soft switching is possible can be expanded.

Further, as the range of the time ratio in which soft switching can be performed expands, the range of power that can be output by soft switching also expands. In FIG. 10, when the control circuit 100 uses the time ratio D within the second range ($D_1$ to $D_2$ and $D_3$ to $D_4$), the output power P that the power conversion apparatus 200 can output is within the range of $P_1$ to $P_2$ and $P_3$ to $P_4$, whereas in FIG. 11, when the control circuit 100 uses the time ratio D within the second range ($D_1'$ to $D_2'$, $D_3'$ to $D_4'$, and $D_5'$ to $D_6'$), the output power P that the power conversion apparatus 200 can output is within the range of 0 to $P_1'$, $P_1'$ to $P_3'$, $P_2'$ to $P_4'$. Specifically, in FIG. 10, the range of the output power $P_2$ to $P_3$ is output by hard switching, in FIG. 11, the range of the output power is included in the range of the output power $P_1'$ to $P_2'$, it can be output by soft switching. That is, by making the resonance frequency higher, it is possible to expand the range of power that can be output by soft switching. Thus, it is possible to improve power conversion efficiency in a wide range of output power.

As a guideline of how high resonance frequency, for example, it is preferable to set resonance frequency six times or more of the switching frequency. The setting of the resonance frequency is not limited to setting it to six times or more than the switching frequency. The resonance frequency can be changed as appropriate depending on the characteristics of the switching element, the characteristics of the filter inductor, the characteristics of the diodes 5, 6 or the like.

Further, in the example of FIG. 11, either when the control circuit 100 uses the time ratio $D_{34}'$ within the second range ($D_3'$ to $D_4'$) or when the control circuit 100 uses the time ratio $D_6'$ within the second range ($D_5'$ to $D_6'$), the power conversion apparatus 200 can output the output power $P_2'$. In this situation, the control circuit 100 compares the time ratio $D_{34}'$ with the time ratio $D_6'$ and selects the time ratio with the smaller value. In the example of FIG. 11, since the time ratio $D_{34}'$ is smaller than the time ratio $D_6'$, the control circuit 100 selects the time ratio $D_{34}'$.

In the example of FIG. 11, the time ratio $D_{34}'$ is included in the second range ($D_3'$ to $D_4'$), and the output power P decreases slowly as the time ratio D increases. On the other hand, the time ratio $D_6'$ is a maximum value of the second range ($D_5'$ to $D_6'$), is also a boundary value between the first range ($D_6'$ to $D_7'$). For this reason, the time ratio $D_6'$ is the bending point of the output power. The magnitude of the output power P that varies with respect to the time ratio error (e.g., calculation error or measurement error) is larger when using the time ratio $D_6'$ than when using the time ratio $D_{34}'$. In the present embodiment, the control circuit 100, when output power when using the time ratio within a specific second range coincides with output power when using the time ration within the other second range (including a plurality of ranges), compares the respective time ratios, and selects the time ratio with lowest value. This prevents the use of time ratios near the inflection point and provides stability in controlling output power.

Further, in the present embodiment, when increasing or decreasing the output power P stepwise, the control circuit 100 preferentially selects the time ratio within the second range with respect to the time ratio within the first range. Using the example in FIG. 11, for example, suppose that the output power P needs to be increased in steps from 0 to $P_4'$. In this instance, when increasing the output power P from 0 to $P_1'$, the control circuit 100 selects the time ratio within the second range ($D_1'$ to $D_2'$) rather than the time ratio within the first range (0 to $D_1'$). Next, when increasing the output power P to $P_1'$ to $P_3'$, the control circuit 100 changes the range to control the time ratio from the second range ($D_1'$ to $D_2'$) to the second range ($D_3'$ to $D_4'$), when the output power P when using the time ratio within the second range ($D_1'$ to $D_2'$) and the output power P when using the time ratio within the second range ($D_3'$ to $D_4'$) coincide with the output power $P_1'$. The control circuit 100 then increments the output power P from $P_1'$ using the time ratio within the second range ($D_3'$ to $D_4'$). Here, although it is possible to output the output power P in the range of $P_1'$ to $P_3'$ when using the time ratio within the second range ($D_3'$ to $D_4'$), the control circuit 100 changes the range for controlling the time ratio from the second range ($D_3'$ to $D_4'$) to the second range ($D_5'$ to $D_6'$) when the output power P when using the time ratio within the second range ($D_3'$ to $D_4'$) and the output power P when using the time ratio within the second range ($D_5'$ to $D_6'$) coincide with the output power $P_2'$. Then, the control circuit 100 uses the time ratio within the second range ($D_5'$ to $D_6'$) to incrementally increase the output power P from $P_2'$ to $P_4'$. Incidentally, in the above example, the control by the control circuit 100 that increases the output power P in each second range is a control that decreases the time ratio D.

Next, the relationship between the time ratio and the output power in the current-continuous mode will be described. In the present embodiment, the control circuit 100, when the power conversion apparatus 200 operates as the current-continuous mode, controls the time ratio within the first range. In the examples of FIG. 10 and FIG. 11, the output power increases with increasing the time ratio in the range of time ratios at which the power conversion apparatus 200 can operate in the current-continuous mode. The rate at which the output power increases is less than the rate at which the output power increases in the current-discontinuous mode. This is because the output current is limited by the filter inductor 9, which is provided in the secondary side circuit 2. The magnitude of the output current is in inverse proportion to the inductance value of the filter inductor 9.

In the present embodiment, as the filter inductor 9, a filter inductor having a characteristic of decreasing the inductance value as current flowing through the filter inductor 9 increases is used. For example, the magnetic saturation characteristic of the magnetic material can be used. Examples of the inductor having such characteristics include a saturable inductor. This maintains a high inductance value in a specific range of output currents, but at output currents beyond this range, the inductance value decreases, thus extending the range of power that can be output, even when the output current increases, such as in the current-continuous mode.

As described above, the power conversion apparatus 200 according to the present embodiment includes switching elements $S_{11}$, $S_{12}$, $S_{21}$, and $S_{22}$, the conversion circuit 10 that converts DC voltage to AC voltage by switching operation of each switching element, the isolation transformer 3 that is connected to the conversion circuit 10, and the rectifier circuit 4 that is connected to the output side of the isolation transformer 3. Further, the power conversion apparatus 200 includes the resonance circuit constituted by the filter inductor 9, the output capacitor 7, and the junction capacitance 5a of the diode 5, and the resonance circuit constituted by the filter inductor 9, the output capacitor 8, and the junction capacitance 6a of the diode 6. The control circuit 100 turns on the switching element $S_{11}$ or the switching element $S_{12}$ in a period when current flowing through the resonance circuit flows from the source terminal to the drain terminal of the switching element $S_{11}$ or the switching element $S_{12}$ via the isolation transformer 3. This allows soft switching to be realized without the need to provide a switching element in the secondary side circuit 2 for soft switching, and thus soft switching can be realized with relatively simple control.

In the present embodiment, the control circuit 100 turns on the switching element $S_{11}$ or the switching element $S_{12}$ so that current flowing through the resonant circuit is resonated by the resonant circuit during a period when no voltage is applied to the primary winding 31 from the conversion circuit 10. In the current-discontinuous mode, by flowing a resonant current during the period of the reactive power, soft switching can be performed in the same way as in the current-continuous mode. As a result, even in a relatively low range of output power such as to operate as the current-discontinuous mode, to suppress switching loss, it is possible to improve power conversion efficiency.

Furthermore, in the present embodiment, the conversion circuit 10 includes the first half-bridge circuit 10a and the second half-bridge circuit 10b. The first half-bridge circuit 10a includes the switching element $S_{11}$ on the high potential side, and the switching element $S_{12}$ on the low potential side, the second half-bridge circuit 10b includes the switching element $S_{21}$ on the high potential side, and the switching element $S_{22}$ on the low potential side. The control circuit 100 turns on the switching element $S_{11}$ when current flowing through the resonance circuit flows from the primary winding 31 in the direction of drain terminal of the switching element $S_{11}$ through the source terminal. The control circuit 100 turns on the switching element $S_{12}$ when current flowing through the resonance circuit flows from the primary winding 31 in the direction the source terminal of the switching element $S_{12}$. This allows soft switching to be realized when the switching element $S_{11}$ or the switching element $S_{12}$ turns on, depending on the direction of current flowing through the conversion circuit 10. As a result, it is possible to improve power conversion efficiency.

In addition, in the present embodiment, the control circuit 100 controls the time ratio between a time in which voltage is output from the first half-bridge circuit 10a to the primary winding 31 and a time in which voltage is output from the second half-bridge circuit 10b to the primary winding 31 so that current flows from the source terminal to the drain terminal of the switching element $S_{11}$ or the switching element $S_{12}$ included in the conversion circuit 10. Since soft switching can be realized by controlling the time ratio, power conversion efficiency can be improved with relatively simple control.

In the present embodiment, the first range is a range of the time ratio in which output power increases with increasing the time ratio, and the second range is a range of the time ratio in which output power decreases with increasing the time ratio. The control circuit 100, when output power when using the time ratio within the first range coincides with output power when using the time ratio within the second range, selects the time ratio within the second range. This allows soft switching to be performed in preference to hard switching, and power conversion efficiency can be improved.

Further, in the present embodiment, the control circuit 100 controls the time ratio within the first range when current flows continuously through the isolation transformer 3 as time passes, that is, when the power conversion apparatus 200 operates in the current-continuous mode. This ensures that when a high power output is needed, the required power can be output appropriately.

In addition, in the present embodiment, the on time period of the switching elements $S_{11}$, $S_{12}$, $S_{21}$, and $S_{22}$ included in the first half-bridge circuit 10a and the second half-bridge circuit 10b are approximately equal. Further, the first half-bridge circuit 10a outputs AC voltage in a form of a pulse to the primary winding 31, the second half-bridge circuit 10b outputs AC voltage in a form of a pulse to the primary winding 31. The control circuit 100 controls the time ratio by controlling the phase difference between voltage output from the first half-bridge circuit 10a and voltage output from the second half-bridge circuit 10b. By controlling the phase difference between the two output voltages, the time ratio can be controlled, so soft switching can be realized by relatively simple control.

In the present embodiment, when the time ratio is increased, the first range and the second range are alternately repeated as shown in FIG. 10 or FIG. 11. When output power when using the time ratio within one specific range of the second ranges coincides with output power when using the time ratio within another second range, the control circuit 100 changes the range to control the time ratio, from the one specific range of the second ranges to another second range. This allows, for example, if output needs to be incrementally increased or decreased, soft switching to be maintained before and after change in output power, thereby improving power conversion efficiency.

Furthermore, in the present embodiment, when output power when using the time ratio within one specific range of the second ranges coincides with output power when using the time ratio within another second range, the control circuit 100 selects the time ratio of lowest value. This prevents the use of time ratios near the inflection point and provides stability in controlling output power.

In addition, in the present embodiment, resonance frequency is a frequency of six times or more than the switching frequency of the each switching element $S_{11}$, $S_{12}$, $S_{21}$, and $S_{22}$. This allows the second range capable of soft switching to be generated within a range of time ratios that output low power output. As a result, power conversion efficiency can be improved over a wide range of output power.

In addition, in the present embodiment, the rectifier circuit 4 includes the filter inductor 9. Further, the filter inductor 9, as the current flowing through the inductance increases, the inductance value has a characteristic of decreasing. This prevents output current from being limited by the filter inductor 9, for example, when it is required to operate the power conversion apparatus 200 in the current-continuous mode to output a high power, thereby expanding the range of power that can be output.

It should be appreciated that the embodiments explained heretofore are described to facilitate understanding of the present invention and are not described to limit the present invention. It is therefore intended that the elements disclosed in the above embodiments include all design changes and equivalents to fall within the technical scope of the present invention.

For example, in the present description, the power conversion apparatus according to the present invention has been described by exemplifying the power conversion apparatus 200, but the present invention is not limited to this. In the present description, the conversion circuit according to the present invention has been described by exemplifying the conversion circuit 10, but the present invention is not limited to this. In the present description, the isolation transformer according to the present invention has been described by exemplifying the isolation transformer 3, but the present invention is not limited to this. In the present description, the rectifier circuit according to the present invention has been described by exemplifying the rectifier circuit 4, but the present invention is not limited to this.

Further, in the present description, the resonance circuit according to the present invention has been described by exemplifying the resonance circuit consisting of the filter inductor 9, the output capacitor 7 and the junction capacitance 5a of the diode 5, and the resonance circuit consisting of the filter inductor 9, the output capacitor 8 and the junction capacitance 6a of the diode 6, but the present invention is not limited to this. In the present description, the control circuit according to the present invention has been described by exemplifying the control circuit 100, but the present invention is not limited to this.

DESCRIPTION OF REFERENCE NUMERALS

1 Primary side circuit
10 Conversion circuit
10a First half-bridge circuit
10b Second half-bridge circuit
11a Input terminal
11b Input terminal
12 Smoothing capacitor
2 Secondary side circuit
4 Rectifier circuit
5 Diode
5a Junction capacitance
6 Diode
6a Junction capacitance
7 Output capacitor
8 Output capacitor
9 Filter inductor
21a Output terminal
21b Output terminal
3 Isolation transformer
31 Primary winding
32 Secondary winding
33 Leakage inductance
100 Control circuit
200 Power conversion apparatus

The invention claimed is:

1. A power conversion apparatus comprising:
a conversion circuit comprising a switching element and configured to convert DC voltage to AC voltage by switching operation of the switching element;
an isolation transformer comprising an input side and an output side, wherein the input side is connected to the conversion circuit;
a rectifier circuit connected to the output side of the isolation transformer;
a resonance circuit connected to the output side of the isolation transformer and comprising a filter inductor and a junction capacitor; and
a control circuit configured to:
turn on the switching element in a period when no voltage is applied to the isolation transformer from the conversion circuit and current flowing from the output side of the isolation transformer to the input side of the isolation transformer flows from a low potential side terminal to a high potential side terminal of the switching element via the isolation transformer; and
control the switching element so that a phase difference of voltage from the conversion circuit (10) to the isolation transformer satisfies following equation (1), $$\frac{V_{out}}{2NV_{in}}\left(1 - \frac{nf_{sw}}{f_{res}}\right) \le D \le \frac{V_{out}}{2NV_{in}}\left\{1 - \frac{(2n-1)f_{sw}}{f_{res}}\right\} \quad (1)$$

wherein "D" represents the phase difference, "N" represents a winding ratio of the isolation transformer, "$V_{in}$" represents input voltage of the power conversion apparatus (200), "$V_{out}$" represents output voltage of the power conversion apparatus, "$f_{sw}$" represents switching frequency of the switching element, "$f_{res}$" represents a resonance frequency of the resonance circuit, and "n" represents a natural number.

2. The power conversion apparatus according to claim 1, wherein:
the control circuit is further configured to control timing of turning on and turning off the switching element so that the current is resonated by the resonance circuit during a period when no voltage is applied from the conversion circuit to the input side of the isolation transformer.

3. The power conversion apparatus according to claim 1, wherein:
the conversion circuit comprises a first half-bridge circuit and a second half-bridge circuit,
the first half-bridge circuit comprises a first high potential side switching element and a first low potential side switching element,
the second half-bridge circuit comprises a second high potential side switching element and a second low potential side switching element, and
the control circuit is further configured to turn on the first high potential side switching element when the current flows from the isolation transformer to the first high potential side switching element, and turn on the first low potential side switching element when the current flows from the isolation transformer to the first low potential side switching element.

4. The power conversion apparatus according to claim 3, wherein:
the control circuit is further configured to control a ratio between a time in which voltage is output from the first half-bridge circuit to the isolation transformer and a time in which voltage is output from the second half-bridge circuit to the isolation transformer so that the current is generated.

5. The power conversion apparatus according to claim 4, wherein:
the control circuit is further configured such that, when an output power of the power conversion apparatus when the ratio is within a first range coincides with an output power of the power conversion apparatus when the ratio is within a second range, the control circuit selects the ratio within the second range, wherein
the first range is a range of the ratio in which output power increases with increasing the ratio, and
the second range is a range of the ratio in which output power increases with decreasing the ratio.

6. The power conversion apparatus according to claim 5, wherein the control circuit is further configured to control the ratio within the first range when the current flows continuously through the isolation transformer as time passes.

7. The power conversion apparatus according to claim 5, wherein:
as the ratio increases, the ratio alternates between one of a plurality of first ranges and one of a plurality of second ranges, and
the control circuit is further configured such that, when an output power of the power conversion apparatus when the ratio is within one of the plurality of second ranges coincides with output power of the power conversion apparatus when the ratio is within an other of the second ranges, the control circuit changes the ratio from within one of the plurality of second ranges to within the other of the second ranges.

8. The power conversion apparatus according to claim 5, wherein the control circuit is further configured such that, when an output power of the power conversion apparatus when the ratio is within one of a plurality of second ranges coincides with an output power of the power conversion apparatus when the ratio is within another of the plurality of second ranges, the control circuit selects the ratio of lowest value.

9. The power conversion apparatus according to claim 3, wherein:
an on period of the first high potential side switching element, an on period of the first low potential side switching element, an on period of the second high potential side switching element, and an on period of the second low potential side switching element are approximately equal,
the first half-bridge circuit is configured to output a first voltage in a form of a pulse to the isolation transformer,
the second half-bridge circuit is configured to output a second voltage in a form of a pulse to the isolation transformer, and
the control circuit is further configured to control a ratio between a time in which voltage is output from the first half-bridge circuit to the isolation transformer and a time in which voltage is output from the second half-bridge circuit to the isolation transformer by controlling a phase difference between the first voltage and the second voltage.

10. The power conversion apparatus according to claim 9, wherein the resonance frequency of the resonance circuit is six times or more than the switching frequency of the switching element.

11. The power conversion apparatus according to claim 1, wherein:
the resonance circuit comprises an inductor, and
the more current flowing in the inductor increases, the more an inductance value of the inductor decreases.

12. A method for controlling a power conversion apparatus, the method comprising:
providing the power conversion apparatus, which comprises:
a conversion circuit configured to convert DC voltage to AC voltage,
an isolation transformer comprising an input side and an output side,
a rectifier circuit,
a resonance circuit, and
a control circuit, wherein:
the conversion circuit comprises a switching element,
the conversion circuit and the input side of the isolation transformer are connected,
the resonance circuit comprises a filter inductor and a junction capacitor,
the resonance circuit and the output side of the isolation transformer are connected, and
the rectifier circuit and the output side of the isolation transformer are connected;
turning on the switching element in a period when no voltage is applied to the isolation transformer from the conversion circuit and current flowing from the output side of the isolation transformer to the input side of the isolation transformer flows from a low potential side terminal to a high potential side terminal of the switching element via the isolation transformer; and
controlling the switching element so that a phase difference of voltage from the conversion circuit (10) to the isolation transformer satisfies following equation (1), $$\frac{V_{out}}{2NV_{in}}\left(1-\frac{nf_{sw}}{f_{res}}\right) \leq D \leq \frac{V_{out}}{2NV_{in}}\left\{1-\frac{(2n-1)f_{sw}}{f_{res}}\right\} \qquad (1)$$

wherein "D" represents the phase difference, "N" represents a winding ratio of the isolation transformer, "yin" represents input voltage of the power conversion apparatus (200), "$V_{out}$" represents output voltage of the power conversion apparatus, "$f_{sw}$" represents switching frequency of the switching element, "$f_{res}$" represents resonance frequency of the resonance circuit, and "n" represents a natural number.

13. A power conversion apparatus comprising:
a conversion circuit comprising a switching element and configured to convert DC voltage to AC voltage by switching operation of the switching element;
an isolation transformer comprising an input side and an output side, wherein the input side is connected to the conversion circuit;
a rectifier circuit connected to the output side of the isolation transformer;
a resonance circuit connected to the output side of the isolation transformer and comprising a filter inductor and a junction capacitor; and
a control circuit configured to turn on the switching element in a period when no voltage is applied to the isolation transformer from the conversion circuit and current flowing from the output side of the isolation transformer to the input side of the isolation transformer flows from a low potential side terminal to a high potential side terminal of the switching element via the isolation transformer, wherein:
the conversion circuit comprises a first half-bridge circuit and a second half-bridge circuit,
the first half-bridge circuit comprises a first high potential side switching element and a first low potential side switching element,
the second half-bridge circuit comprises a second high potential side switching element and a second low potential side switching element,
the control circuit is further configured to turn on the first high potential side switching element when the current flows from the isolation transformer to the first high potential side switching element, and turn on the first low potential side switching element when the current flows from the isolation transformer to the first low potential side switching element and
the control circuit is further configured to control a ratio between a time in which voltage is output from the first half-bridge circuit to the isolation transformer and a time in which voltage is output from the second half-bridge circuit to the isolation transformer so that the current is generated.

14. The power conversion apparatus according to claim 13, wherein:
the control circuit is further configured such that, when an output power of the power conversion apparatus when the ratio is within a first range coincides with an output power of the power conversion apparatus when the ratio is within a second range, the control circuit selects the ratio within the second range, wherein
the first range is a range of the ratio in which output power increases with increasing the ratio, and
the second range is a range of the ratio in which output power increases with decreasing the ratio.

15. The power conversion apparatus according to claim 14, wherein the control circuit is further configured to control the ratio within the first range when the current flows continuously through the isolation transformer as time passes.

* * * * *